(12) United States Patent
Namose

(10) Patent No.: US 7,999,987 B2
(45) Date of Patent: Aug. 16, 2011

(54) ELECTRO-OPTICAL DISPLAY DEVICE AND ELECTRONIC DEVICE

(75) Inventor: Isamu Namose, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 499 days.

(21) Appl. No.: 12/326,960

(22) Filed: Dec. 3, 2008

(65) Prior Publication Data

US 2009/0141330 A1    Jun. 4, 2009

(30) Foreign Application Priority Data

Dec. 3, 2007    (JP) ................................ 2007-312929

(51) Int. Cl.
   G02B 26/02    (2006.01)
(52) U.S. Cl. ....................................... 359/227
(58) Field of Classification Search ............... 359/200.6, 359/227, 290, 291, 292
   See application file for complete search history.

(56) References Cited

U.S. PATENT DOCUMENTS

| | | | |
|---|---|---|---|
| 5,745,281 A | 4/1998 | Yi et al. | |
| 6,339,459 B1 | 1/2002 | Ichikawa et al. | |
| 6,775,048 B1 | 8/2004 | Starkweather et al. | |
| 6,967,761 B2 | 11/2005 | Starkweather et al. | |
| 6,967,763 B2 | 11/2005 | Fujii et al. | |
| 6,990,811 B2 | 1/2006 | Starkweather et al. | |
| 7,053,519 B2 * | 5/2006 | Sinclair ........................ | 310/309 |
| 7,151,627 B2 | 12/2006 | Starkweather et al. | |
| 7,154,654 B2 | 12/2006 | Kimura | |
| 7,168,249 B2 | 1/2007 | Starkweather et al. | |

FOREIGN PATENT DOCUMENTS

| | | |
|---|---|---|
| JP | 06-003670 | 1/1994 |
| JP | 09-189869 | 7/1997 |
| JP | 09-258195 | 10/1997 |
| JP | 11-143402 | 5/1999 |
| JP | 11-212059 | 8/1999 |
| JP | 2002-214543 | 7/2002 |
| JP | 2004-006782 | 1/2004 |
| JP | 2004-287215 | 10/2004 |
| JP | 2004-295087 | 10/2004 |
| JP | 2004-347982 | 12/2004 |
| JP | 2006-098990 | 4/2006 |

* cited by examiner

*Primary Examiner* — Euncha Cherry

(57) ABSTRACT

An electro-optical display device comprises: an active matrix unit including a substrate having one surface and the other surface and a plurality of switching elements provided on the one surface of the substrate; a shutter unit provided on the active matrix unit, and a first microlens array provided on the other surface of the active matrix unit, the first microlens array having a plurality of microlenses formed on the other surface of the substrate in a corresponding relationship with the plurality of window portions. The shutter unit is comprised of: a base provided so as to oppose the one surface of the substrate, the base having a plurality of window portions provided in a corresponding relationship with the plurality of switching elements; movable plates provided above the plurality of window portions so as to be displaceable relative to the base, the movable plates opening and closing the plurality of window portions to obtain an opening state and a closing state of each of the plurality of window portions; and driving means for displacing the movable plates and switching the opening state and the closing state of each of the plurality of window portions. The electro-optical display device is capable of using light with increased utilization efficiency and displaying a high quality image, while exhibiting enhanced reliability. Further, an electronic device provided with the electro-optical display device is also provided.

13 Claims, 14 Drawing Sheets

ELECTRO-OPTICAL DISPLAY DEVICE AND ELECTRONIC DEVICE

CROSS-REFERENCE TO RELATED APPLICATION

This application claims priority to Japanese Patent Application No. 2007-312929 filed Dec. 3, 2007, which is hereby expressly incorporated by reference herein in its entirety.

BACKGROUND

1. Technical Field

The present invention relates to an electro-optical display device and an electronic device, and more particularly to an electro-optical display device and an electronic device provided with the electro-optical display device.

2. Related Art

As an electro-optical display device, there is known, e.g., a liquid crystal display panel that employs an active matrix drive system (one example of such an electro-optical display device is disclosed in JP-A 2004-6782).

As disclosed in, e.g., JP-A 2004-6782, the liquid crystal display panel includes light shutters that make use of optical characteristics of a liquid crystal which are to be changed by application of electric fields. For example, letters and images can be displayed by providing the light shutters in a one-to-one relationship with pixels.

However, the liquid crystal display panel involves a problem in that the liquid crystal is degraded by light. This problem becomes more severe as the light used gets more intensive. For that reason, it is impossible for the liquid crystal display panel to display a high quality image for an extended period of time.

Further, in the electro-optical display device stated above, it is desirable to increase utilization efficiency of light.

SUMMARY

It is an object of the present invention to provide an electro-optical display device capable of using light with increased utilization efficiency and displaying a high quality image, while exhibiting enhanced reliability. Further, it is another object of the present invention to provide an electronic device incorporating the electro-optical display device.

The object noted above is accomplished by the present invention set forth below.

The present invention is directed to an electro-optical display device which comprises an active matrix unit including a substrate having one surface and the other surface and a plurality of switching elements provided on the one surface of the substrate; a shutter unit provided on the active matrix unit, and a first microlens array provided on the other surface of the substrate of the active matrix unit, the first microlens array having a plurality of microlenses formed on the other surface of the substrate in a corresponding relationship with a plurality of window portions.

The shutter unit is comprised of a base provided so as to oppose the one surface of the substrate, the base having the plurality of window portions provided in a corresponding relationship with the plurality of switching elements; movable plates provided above the plurality of window portions so as to be displaceable relative to the base, the movable plates opening and closing the plurality of window portions to obtain an opening state and a closing state of each of the plurality of window portions; and driving means for displacing the movable plates and switching the opening state and the closing state of each of the plurality of window portions.

The electro-optical display device constructed as described above is capable of using light with increased utilization efficiency and displaying a high quality image, while exhibiting enhanced reliability.

In the electro-optical display device of the present invention, it is preferred that the base has one surface and the other surface opposing to the one surface of the substrate, the base includes a light shielding portion formed in the base other than the window portions, wherein the movable plates are provided so as to be displaceable along the one surface of the base so that the movable plates can be positioned over the window portions in the closing state and positioned over the light shielding portion in the opening state.

This makes it possible for the movable plates to open and close the window portions with a relatively simple structure.

In the electro-optical display device of the present invention, it is also preferred that the shutter unit is further comprised of biasing members for biasing the movable plates so as to maintain the opening state or the closing state of the window portions.

With this structure, it is not necessary for the driving means to apply a driving force to the movable plates when the movable plates are kept in one of the opening state and the closing state. This assists in saving electric power.

In the electro-optical display device of the present invention, it is also preferred that each of the biasing members is constituted of an elastically deformable elastic member for supporting the movable plate.

This allows the elastic member to possess a function of supporting the movable plates and a function of biasing them. The movable plates and the elastic member can be integrally formed to have increased mechanical strength. Therefore, it is possible to enhance reliability of the electro-optical display device. In addition, the movable plates and the elastic member can be collectively formed in the same base.

In the electro-optical display device of the present invention, it is also preferred that the driving means include a pair of electrodes, wherein one of the pair of electrodes is provided on the movable plates and the other of the pair of electrodes is provided on the side of the base, wherein the movable plates are displaced by applying a voltage to between the pair of electrodes, thereby generating an electrostatic attraction force between the pair of electrodes.

This makes it possible to simplify the construction of the driving means, thereby reducing a number of constituent parts of the driving means and occurrence of trouble in the driving means.

In the electro-optical display device of the present invention, it is also preferred that each of the pair of the electrodes has a comb shape so as to mesh with each other.

This makes it possible to increase an area of opposing surfaces between the pair of the electrodes, thereby making greater the electrostatic attraction force generated between the pair of the electrodes.

In the electro-optical display device of the present invention, it is also preferred that the electro-optical display device further comprises a second microlens array provided on the shutter unit so as to oppose the first microlens array through the shutter unit and the active matrix unit.

This ensures that the light departing from the electro-optical display device becomes parallel light.

In the electro-optical display device of the present invention, it is also preferred that the window portions and the movable plates corresponding thereto are provided in plural numbers with respect to each of the switching elements.

This makes it possible to increase redundancy of the electro-optical display device. Moreover, it is possible to reduce sizes of the movable plates, consequently increasing a switching speed (responsiveness) at which the movable plates are switched between the opening state and the closing state.

In the electro-optical display device of the present invention, it is also preferred that when the shutter unit is seen in a plan view, the movable plates have substantially the same shape as the window portions.

This makes it possible to efficiently arrange the movable plates and the window portions.

In the electro-optical display device of the present invention, it is also preferred that the driving means is designed so as to be capable of adjusting the opening state and the closing state of each of the window portions.

This makes it possible to realize multiple-tone or analog driving.

In the electro-optical display device of the present invention, it is also preferred that each of the plurality of switching elements is comprised of: a fixed electrode formed on the one surface of the substrate; a movable electrode provided so as to face a part of the fixed electrode so that the movable electrode is displaceable to come into contact with or move away from the fixed electrode, and a driving electrode provided to face the movable electrode with an electrostatic gap left between the movable electrode and the driving electrode, the driving electrode formed on the one surface of the substrate in a side by side relation with the fixed electrode.

The movable electrode is conducted with the fixed electrode by applying a voltage to between the movable electro 5 and the driving electrode, generating an electrostatic attraction force between the movable electrode and the driving electrode, thereby displacing the movable electrode and bringing the movable electrode into contact with the fixed electrode.

This makes it possible to increase light resistance of the switching elements and eventually the light resistance of the electro-optical display device as a whole.

In the electro-optical display device of the present invention, it is also preferred that the active matrix unit further includes a plurality of first wiring lines extending on the one surface of the substrate in a mutually parallel relationship and a plurality of second wiring lines intersecting the plurality of first wiring lines and extending on the one surface of the substrate in a mutually parallel relationship.

Each of the plurality of first wiring lines and each of the plurality of second wiring lines form an intersecting point. Each of the plurality of switching elements is provided near the intersecting point.

This makes it possible to arrange the switching elements in a matrix pattern and to energize the respective switching elements.

Further, in order to accomplish another object, the present invention is also directed to an electronic device provided with the electro-optical display device described above.

The electronic device is capable of displaying a high quality image, while exhibiting enhanced reliability.

DETAILED DESCRIPTION OF THE INVENTION

Hereinafter, preferred embodiments of an electro-optical display device and an electronic device in accordance with the present invention will be described with reference to the accompanying drawings.

First Embodiment

First, a description will be made on a first embodiment of the present invention.

Figure 1:
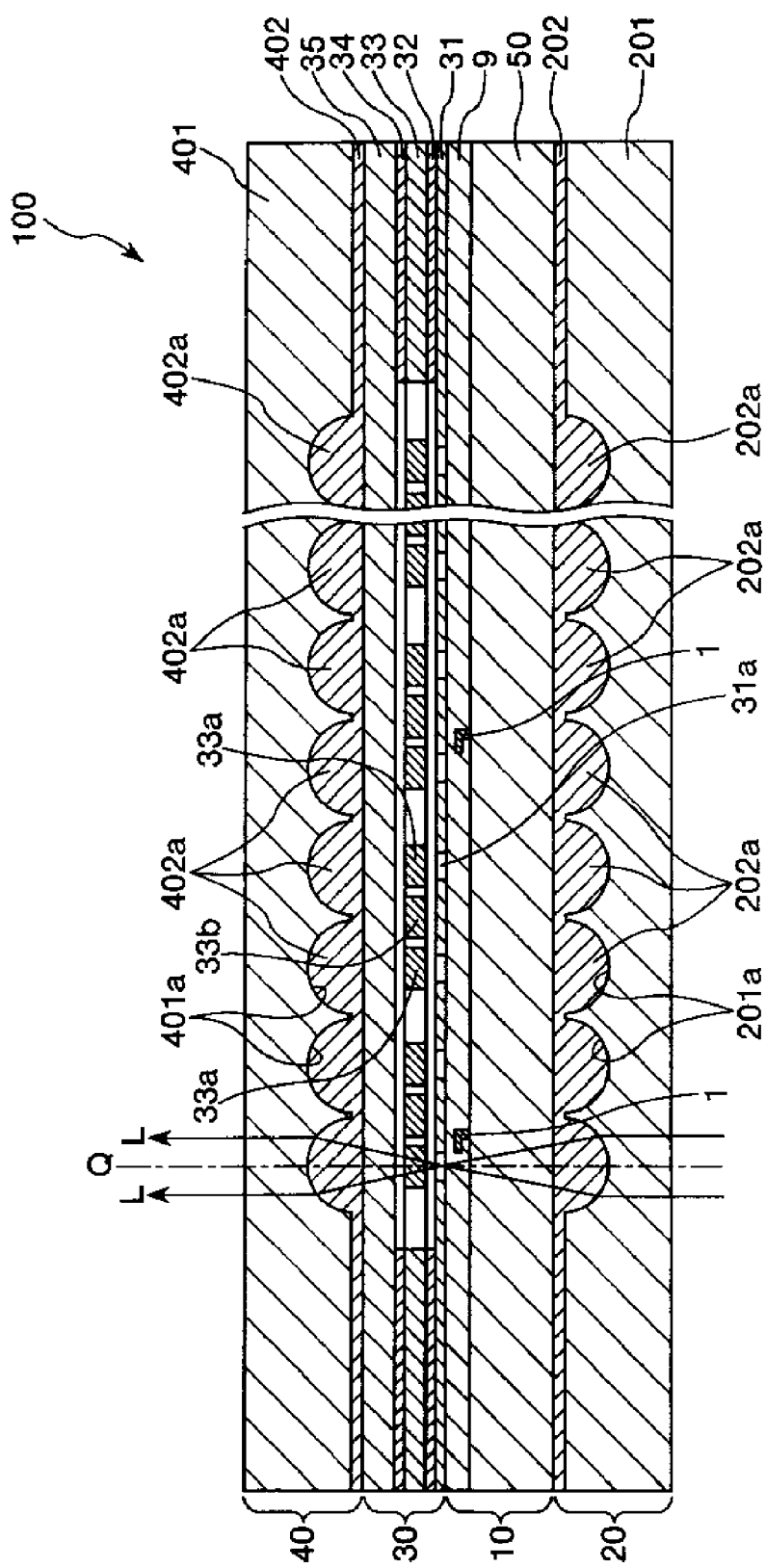
FIG. 1 is a vertical section view showing the configuration of an electro-optical display device in accordance with a first embodiment of the present invention.
Figure 2:
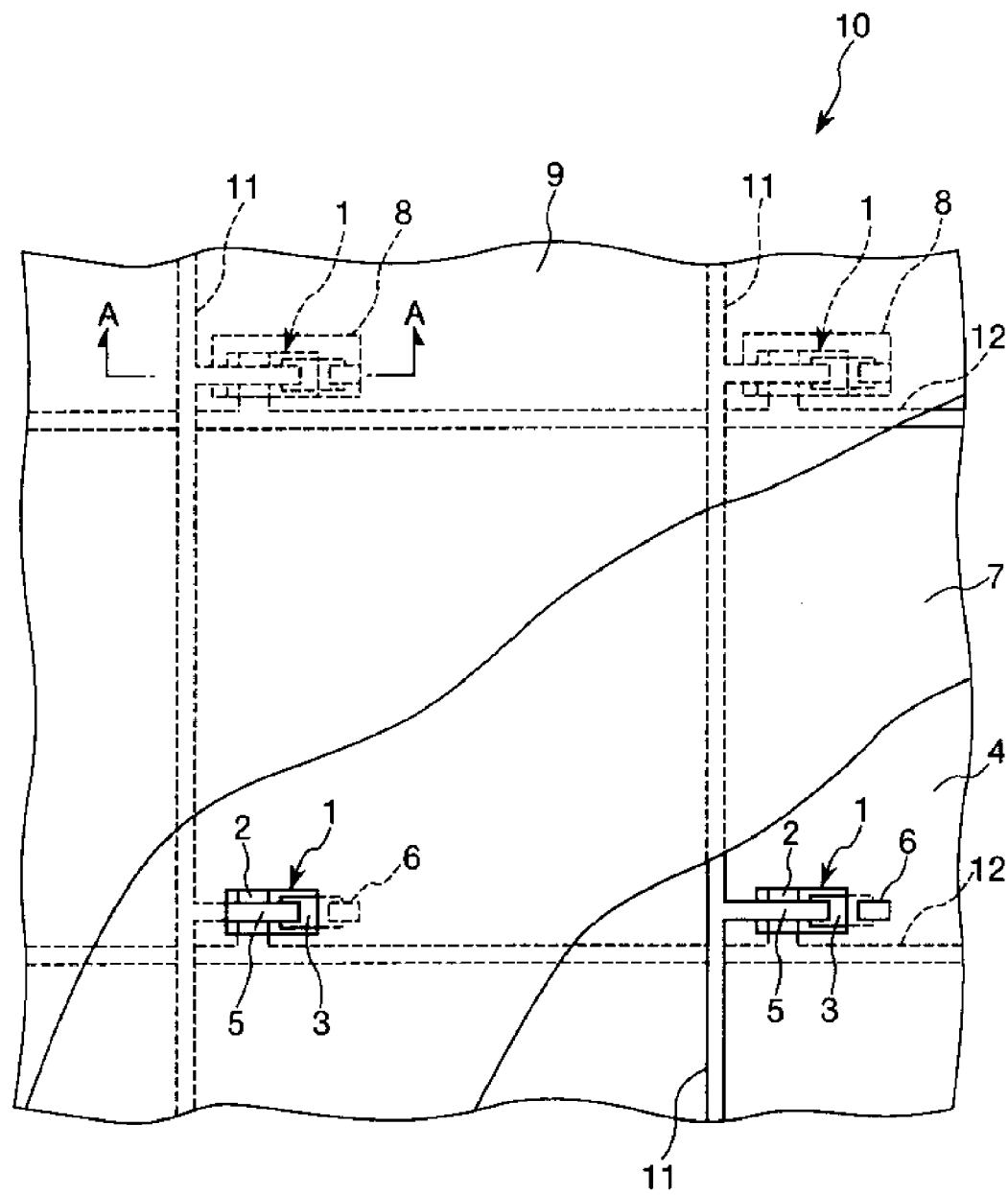
FIG. 2 is a plan view showing an active matrix unit employed in the electro-optical display device shown in FIG. 1.
Figure 3:
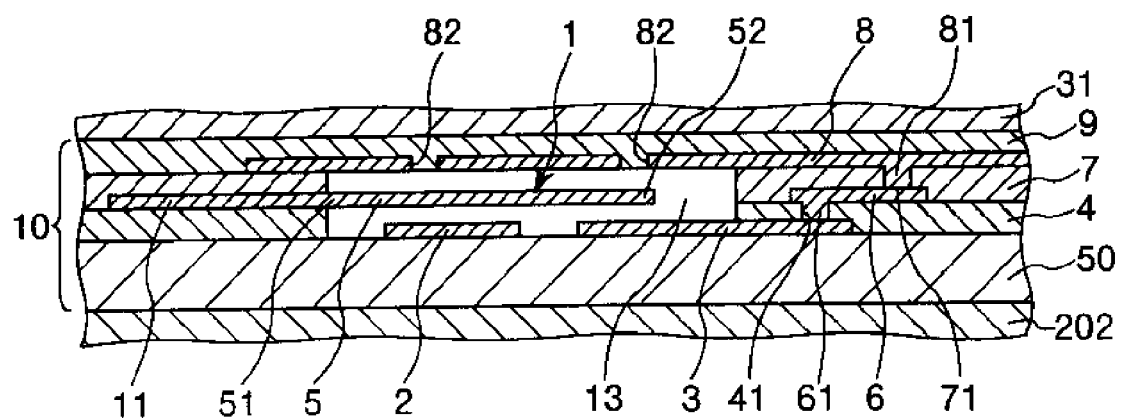
FIG. 3 is a sectional view taken along line A-A in FIG. 2.

FIG. 1 is a vertical section view showing the configuration of an electro-optical display device in accordance with a first embodiment of the present invention. FIG. 2 is a plan view showing an active matrix unit employed in the electro-optical display device shown in FIG. 1. FIG. 3 is a sectional view taken along line A-A in FIG. 2.

Figure 4:
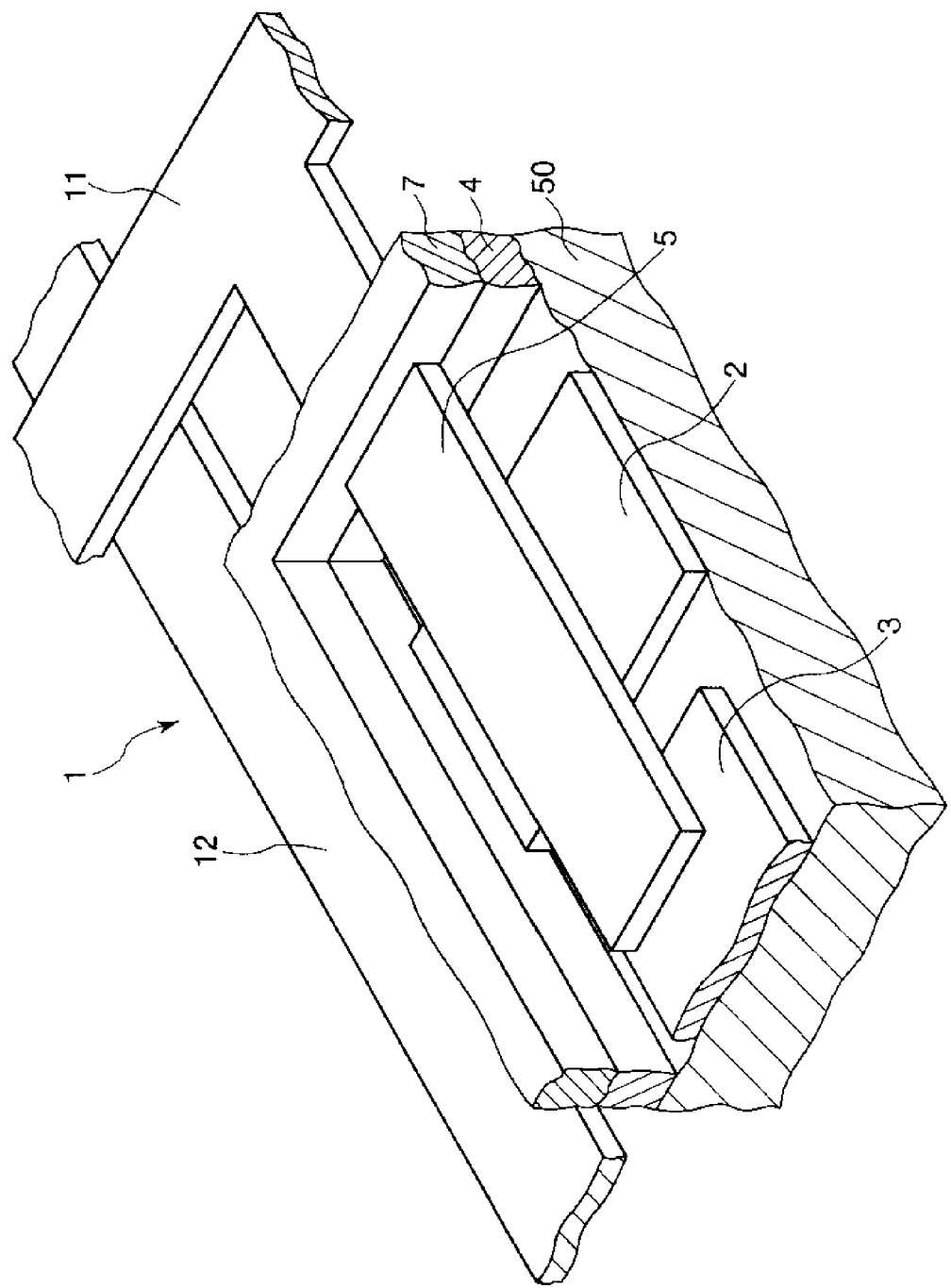
FIG. 4 is a perspective view for explaining a switching element shown in FIG. 3.
Figure 5:
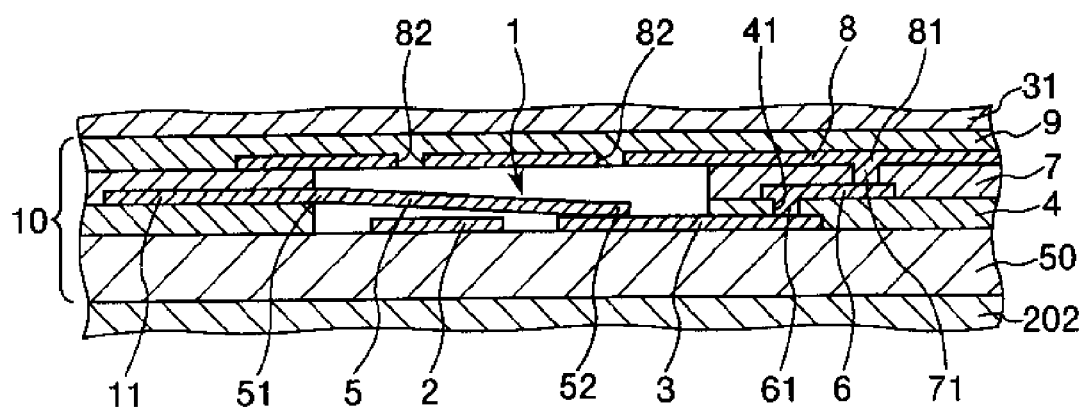
FIG. 5 is a view for explaining an operation of the switching element shown in FIG. 3.
Figure 6:
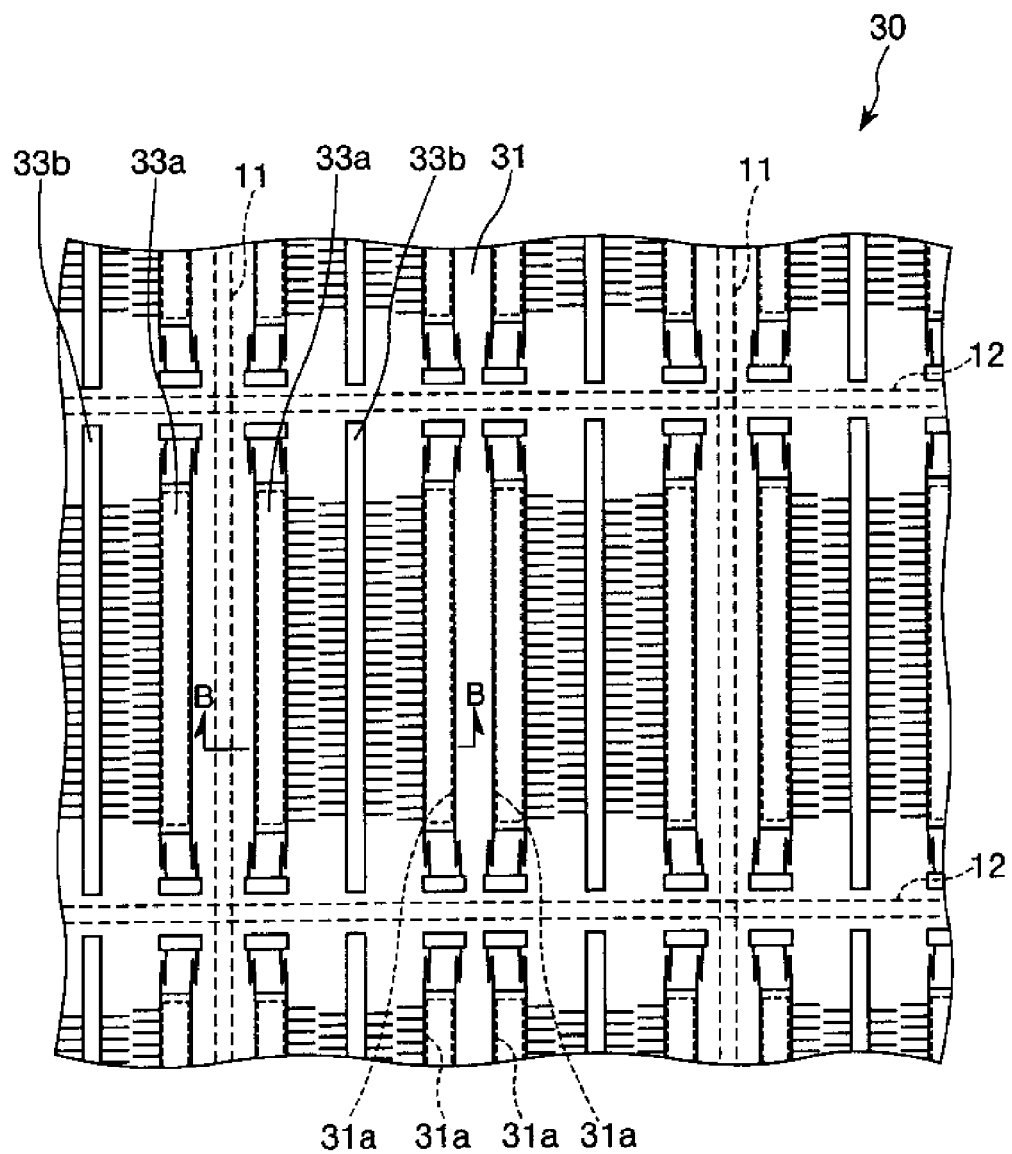
FIG. 6 is a plan view showing a shutter unit employed in the electro-optical display device shown in FIG. 1.
Figure 7:
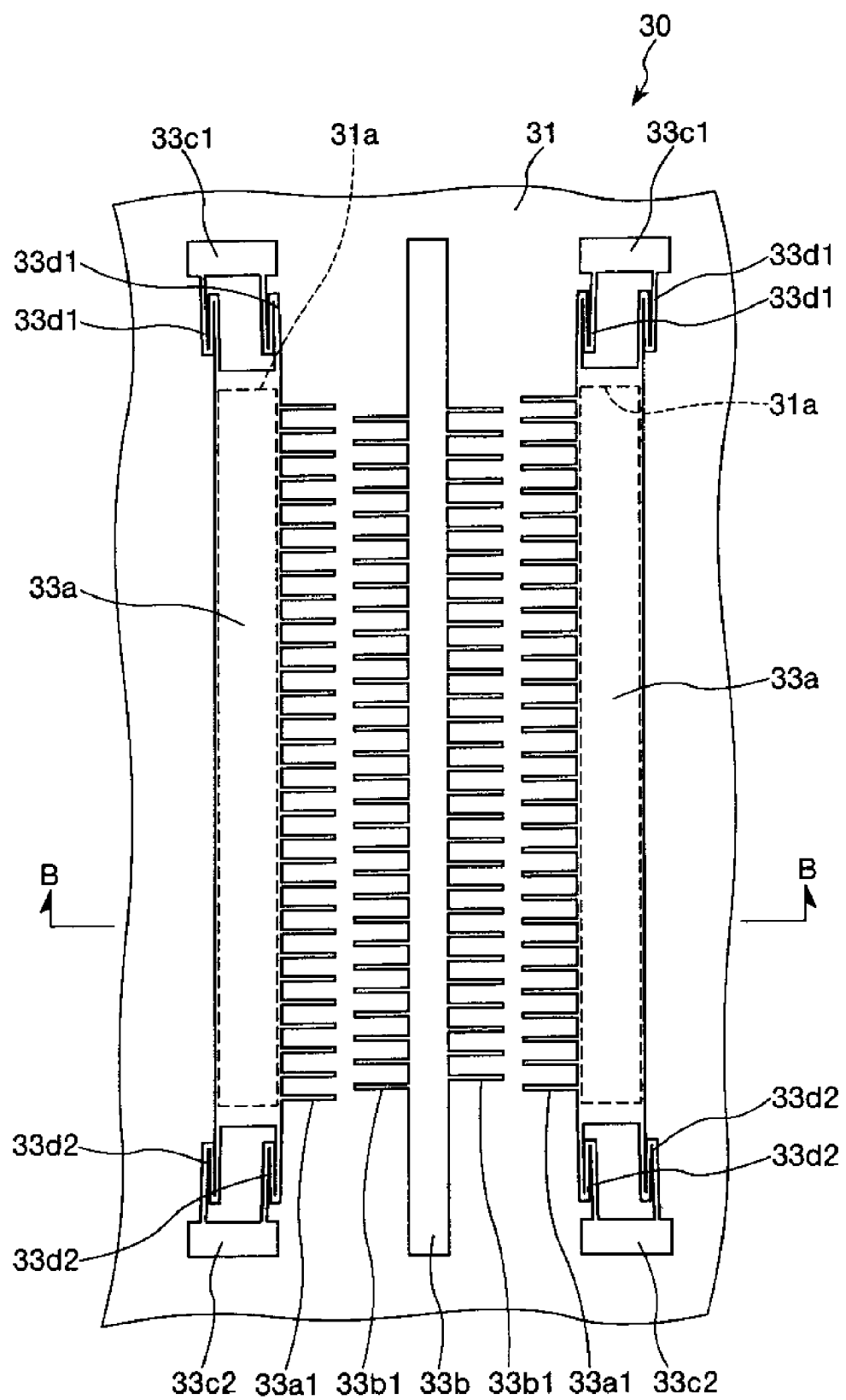
FIG. 7 is a partially enlarged plan view of the shutter unit shown in FIG. 6.

FIG. 4 is a perspective view for explaining a switching element shown in FIG. 3. FIG. 5 is a view for explaining an operation of the switching element shown in FIG. 3. FIG. 6 is a plan view showing a shutter unit employed in the electro-optical display device shown in FIG. 1. FIG. 7 is a partially enlarged plan view of the shutter unit shown in FIG. 6.

Figure 8:
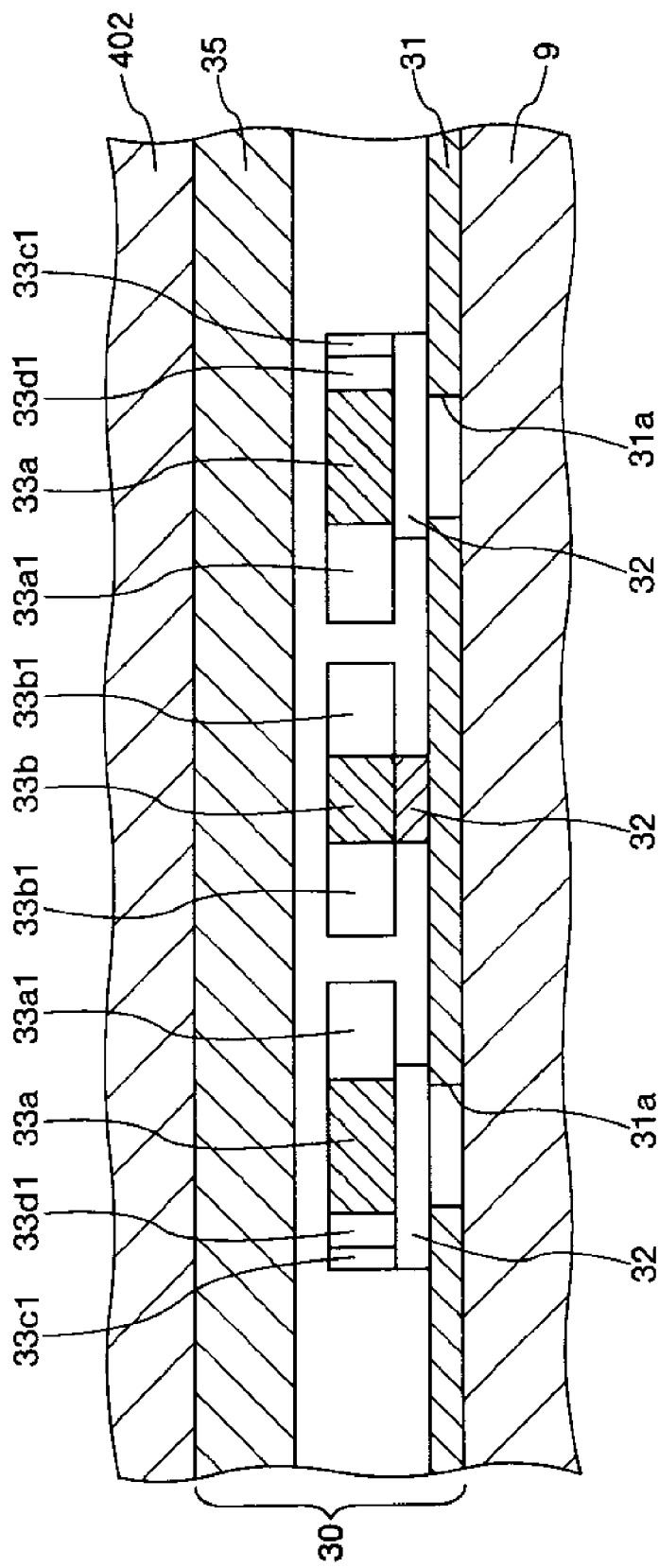
FIG. 8 is a sectional view taken along line B-B in FIG. 7.
Figure 9:
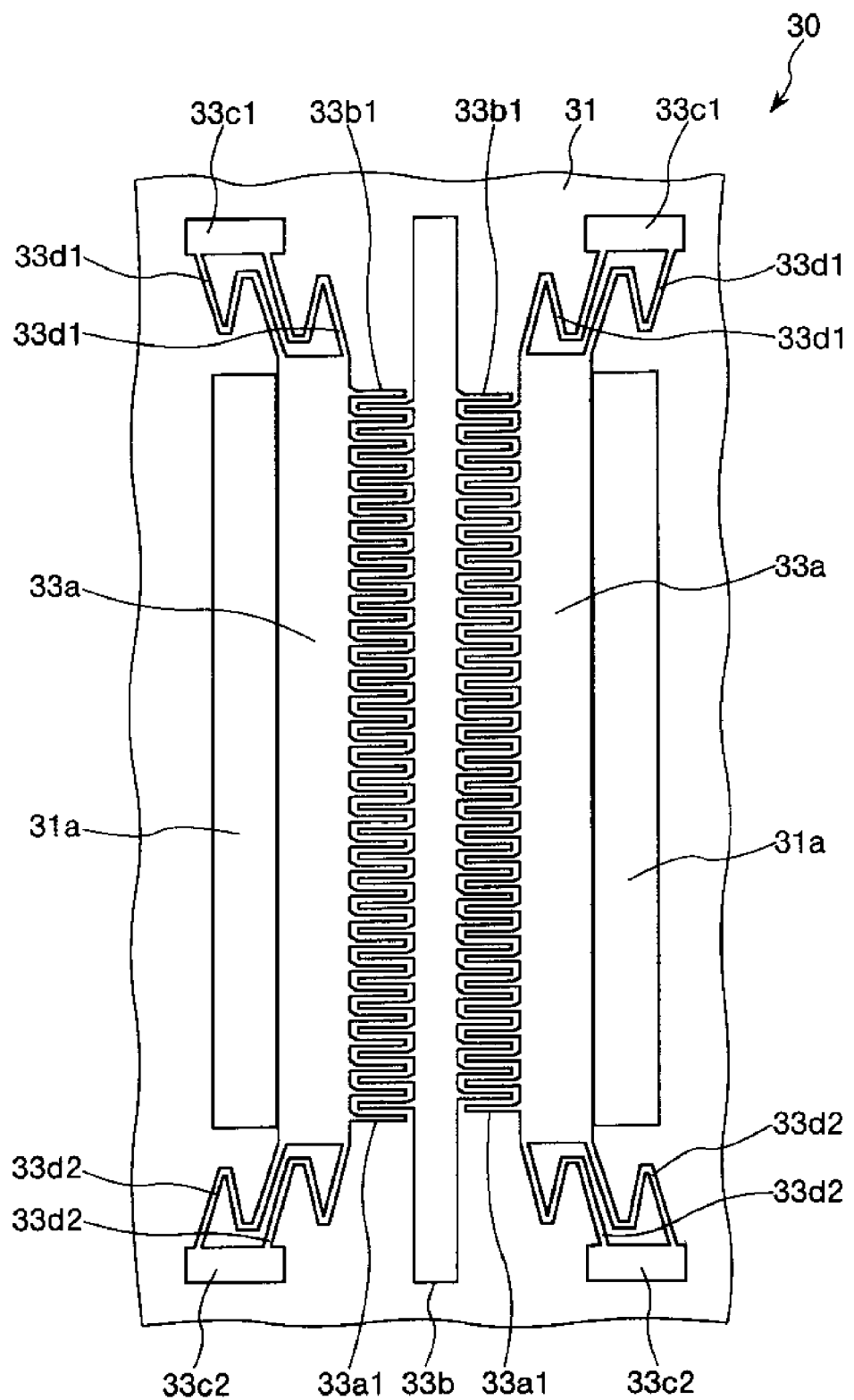
FIG. 9 is a view for explaining an operation of the shutter unit shown in FIG. 7.

FIG. 8 is a sectional view taken along line B-B in FIG. 7. FIG. 9 is a view for explaining an operation of the shutter unit shown in FIG. 7. For the sake of convenience in the description, the upper side in FIGS. 1, 3 and 5 will be hereinafter referred to as "upper", the lower side as "lower", the right side as "right" and the left side as "left". Likewise, the front side of a drawing sheet in FIGS. 2, 6, 7 and 9 will be referred to as "upper", the rear side as "lower", the right side as "right" and the left side as "left".

Electro-Optical Display Device

As shown in FIG. 1, an electro-optical display device 100 includes an active matrix unit 10, a shutter unit 30 operable by the electric power supplied from the active matrix unit 10, a microlens array (first microlens array) 20 for collecting or converging incident light and a microlens array (second microlens array) 40 for diverging or collimating outgoing light.

In the electro-optical display device 100, the microlens array 20, the active matrix unit 10, the shutter unit 30 and the microlens array 40 are laminated one atop another.

With the electro-optical display device 100, a light L incoming from the lower side in FIG. 1 to the microlens array 20 is collected or converged as it passes through the microlens array 20. Then, the light L passes through the active matrix unit 10, the shutter unit 30 and the microlens array 40.

At this time, an opening and closing operation of a shutter mechanism of the shutter unit 30 is controlled by a switching operation of the active matrix unit 10. The brightness of the outgoing light L is controlled depending on an opening and closing degree of the shutter mechanism.

Seeing that the microlens array 20 is provided on a light incoming side of the electro-optical display device 100, it is possible to focus the light L on a desired region of the shutter unit 30, to prevent attenuation of the light L and to increase utilization efficiency of the light L. On the other hand, since the microlens array 40 is provided on a light outgoing side, it is possible to prevent the outgoing light L from diverging beyond necessity.

Hereinafter, individual parts that form the electro-optical display device 100 will be described in detail one by one.

Active Matrix Unit

Referring to FIG. 2, the active matrix unit 10 includes a substrate 50. The active matrix unit 10 further includes a plurality of first wiring lines 11, a plurality of second wiring lines 12 arranged to intersect the first wiring lines 11 in a matrix manner and a plurality of switching elements 1 arranged near intersecting points of the first wiring lines 11 and the second wiring lines 12, all of which are provided on the substrate 50.

The substrate 50 supports the individual parts (layers) forming the active matrix unit 10 (support body) as described later.

As the substrate 50, it is possible to use, e.g., a glass substrate, a plastic substrate (or a resin substrate) made of polyimide, polyethylene terephthalate (PET), polyethylene naphthalate (PEN), polymethyl methacrylate (PMMA), polycarbonate (PC), polyether sulfone (PES), aromatic polyester (liquid crystal polymer) or the like, a quartz substrate, a silicon substrate and a gallium arsenic substrate.

The substrate 50 has an average thickness that varies slightly depending on a constituent material thereof. Although not particularly limited, the average thickness of the substrate 50 may be preferably in the range of about 10 to 2000 µm and more preferably in the range of about 30 to 300 µm.

If the substrate 50 is too thin, there is a fear that the substrate 50 suffers from reduction in strength to thereby loose its function as the support body. If the substrate 50 is too thick, it is not desirable from the viewpoint of weight saving.

The first wiring lines 11 are arranged on the substrate 50 so as to extend along a first direction in a mutually parallel relationship. The second wiring lines 12 are arranged on the substrate 50 so as to extend along a second direction perpendicular to the first direction in a mutually parallel relationship so that they intersect the first wiring lines 11.

In the present embodiment, the first wiring lines 11 and the second wiring lines 12 are arranged on the substrate 50 in an orthogonal relationship with each other, that is, in a matrix manner. The first wiring lines 11 are provided for a selection of columns and the second wiring lines 12 are provided for a selection of rows. In other words, one of the first wiring lines 11 and the second wiring lines 12 serves as data lines and the other serves as scanning lines.

If the column selection and the row selection are performed using the first wiring lines 11 and the second wiring lines 12 in this manner, it becomes possible to selectively operate a desired one of the switching elements 1 (to apply a voltage between movable electrode 5 and driving electrode 2).

Inasmuch as the respective switching elements 1 are provided near the intersecting points of the first wiring lines 11 and the second wiring lines 12 thus arranged, it is possible to arrange the switching elements 1 in a matrix pattern and to energize the respective switching elements 1.

A constituent material of each of the first wiring lines 11 and the second wiring lines 12 is not particularly limited insofar as it shows electric conductivity. Examples of this constituent material include: a conductive material such as Pd, Pt, Au, W, Ta, Mo, Al, Cr, Ti, Cu and an alloy thereof; a conductive oxide such as ITO, FTO, ATO and $SnO_2$; a carbon-based material such as carbon black, carbon nanotube and fullerene; and a conductive polymer material such as polyacetylene, polypyrrole, polythiophene including PEDOT (polyethylene dioxythiophene), polyaniline, poly(p-phenylene), polyfluorene, polycarbazole, polysilane and a derivative thereof, one or more of which can be used independently or in combination. Typically, the conductive polymer material is used in a state that they are doped with a polymer such as iron oxide, iodine, inorganic acid, organic acid or polystyrene salphonic acid to become electrically conductive.

Among the above-noted materials, it is preferred that the constituent material of the first wiring lines 11 and the second wiring lines 12 is mainly constituted of Al, Au, Cr, Ni, Cu, Pt or an alloy thereof. Use of these metallic materials makes it possible to easily and cost-effectively form the first wiring lines 11 and the second wiring lines 12 by an electrolytic plating method or an electroless plating method. It is also possible to improve characteristics of the active matrix unit 10.

In the present embodiment, the second wiring lines 12 is provided on one surface (the upper surface) of the substrate 50. The first insulation layer 4 is also provided on the one surface of the substrate 50 so as to cover the second wiring lines 12. A conductive layer 6 as well as the first wiring lines 11 is provided on the upper surface of the first insulation layer 4. A second insulation layer 7 is also provided on the first insulation layer 4 so as to cover the first wiring lines 11 and the conductive layer 6.

The first insulation layer 4 and the second insulation layer 7 are partially removed to form a receiving portion (or a removal portion) 13 that receives a driving portion of each of the switching elements 1 which will be mentioned below. Hereinafter, a description will be made with regard to one switching element 1 based on FIGS. 3 to 5.

Also formed in the first insulation layer 4 is a through-hole (or a contact hole) 41 through which the conductive layer 6 is connected to the below-mentioned fixed electrode 3. In the second insulation layer 7, there is formed a through-hole (or a contact hole) 71 through which the conductive layer 6 is connected to a pixel electrode 8 described below.

A constituent material each of the first insulation layer 4 and the second insulation layer 7 is not particularly limited insofar as it shows insulation property. Various kinds of organic materials (particularly, organic polymer materials) or various kinds of inorganic materials can be used as the constituent material of each of the first insulation layer 4 and the second insulation layer 7.

Examples of the organic materials with insulation property include: an acryl-based resin such as polystyrene, polyimide, polyamide-imide, polyvinyl phenylene, polycarbonate (PC) or polymethyl methacrylate (PMMA); a fluorine-based resin such as polytetrafluoroethylene (PTFE) or the like; a phenol-based resin such as polyvinyl phenol and a novolac resin; an olefin-based resin such as polyethylene, polypropylene, polyisobutylene and polybutene; and the like, one or more of which can be used independently or in combination.

On the other hand, examples of the inorganic materials with insulation property include: a metal oxide such as silica ($SiO_2$), silicon nitride, aluminum oxide and tantalum oxide; a metal composite oxide such as barium titanate strontium and zirconium lead titanate; and the like, one or more of which can be used independently or in combination.

The conductive layer 6 is provided to electrically interconnect the fixed electrode 3 and the pixel electrode 8 mentioned above.

The conductive layer 6 has a penetrating electrode portion 61 inserted into the through-hole 41 of the first insulation layer 4. Thus, the conductive layer 6 and the fixed electrode 3 are electrically connected to each other.

A constituent material of the conductive layer 6 is not particularly limited insofar as it shows insulation property. For example, the same material as the constituent materials of the first wiring lines 11 and the second wiring lines 12 can be used as the constituent material of the conductive layer 6.

The pixel electrode 8 is provided on the upper side of the one surface of the substrate 50 and is configured to apply a voltage for driving each pixel of the electro-optical display device 100.

The pixel electrode 8 is electrically connected to the corresponding fixed electrode of the below-mentioned shutter unit 30 through a wiring line not shown in the drawings.

Examples of a constituent material of the pixel electrode 8 include: a metal such as Ni, Pd, Pt, Li, Mg, Ca, Sr, La, Ce, Er, Eu, Sc, Y, Yb, Ag, Cu, Co, Al, Cs and Rb; an alloy containing these metals, such as MgAg, AlLi and CuLi; an oxide such as ITO (Indium Titanium Oxide), $SnO_2$, Sb-containing $SnO_2$ and Al-containing ZnO; and the like, one or more of which can be used independently or in combination.

Particularly, in the case where the active matrix unit 10 is incorporated into the below-mentioned transmission type electro-optical display device 100, a transparent material selected from the above-noted materials is used as the constituent material of the pixel electrode 8.

The pixel electrode 8 has a penetrating electrode portion 81 inserted into the through-hole 71 of the second insulation layer 7. Thus, the pixel electrode 8 and the conductive layer 6 are electrically connected to each other.

A part of the lower surface (the surface facing toward the substrate 50) of the pixel electrode 8 forms a part of a wall surface of the corresponding receiving portion 13. Formed in the pixel electrode 8 is through-holes 82 through which an etching solution is supplied when forming the receiving portion 13 in the below-mentioned manufacturing process. The through-holes 82 are sealed up by a sealing layer 9.

A base 31 to be set forth later is provided on the upper surface of the sealing layer 9. Alternatively, the sealing layer 9 may be omitted and the through-holes 82 may be sealed up by the base 31. In other words, the base 31 may not only serve as a black matrix which will be described below but also may have a function of sealing up the through-holes 82.

A constituent material of the sealing layer 9 is not particularly limited insofar as it has a function of sealing up the through-holes 82. Various kinds of organic materials or various kinds of inorganic materials can be used as the constituent material of the sealing layer 9. Polymer materials such as a polyimide resin, a polyamide-imide resin, polyvinyl alcohol and polytetrafluoroethylene are preferably used as the constituent material of the sealing layer 9.

Each of the switching elements 1 is connected to the pixel electrode 8 through the conductive layer 6 in a corresponding relationship with the pixel electrode 8. The driving of each pixel of the electro-optical display device 100 is controlled by controlling the operation of each of the switching elements 1.

As shown in FIGS. 3 and 4, each of the switching elements 1 includes a driving electrode 2 electrically connected to the corresponding one of the second wiring lines 12, a fixed electrode 3 electrically connected to the corresponding the pixel electrode 8 and a movable electrode (a switch piece) 5 electrically connected to the corresponding one of the first wiring lines 11.

Hereinafter, individual parts of each of the switching elements 1 will be described in detail.

The driving electrode 2 is formed to laterally protrude from each of the second wiring lines 12 and is provided on the one surface (the upper surface) of the substrate 50. Furthermore, the driving electrode 2 is provided to oppose the movable electrode 5 with an electrostatic gap left therebetween.

The driving electrode 2 serves to generate an electrostatic attraction force between itself and the movable electrode 5 (namely, in the electrostatic gap) by applying a voltage (or generating a potential difference) between itself and the movable electrode 5.

The driving electrode 2 is electrically connected to the corresponding one of the second wiring lines 12. In the present embodiment, the second wiring lines 12 are also formed on the upper surface of the substrate 50 (namely, on the same surface as the driving electrode 2). This means that the driving electrodes 2 and the second wiring lines 12 are formed integrally.

A constituent material of the driving electrode 2 is not particularly limited insofar as it has conductivity. For example, the same material as the constituent materials of the first wiring lines 11 and the second wiring lines 12 can be used as the constituent material of the driving electrode 2.

The thickness of the driving electrode 2 is not particularly limited and may be preferably in the range of about 10 to 1000 nm and more preferably in the range of about 50 to 500 nm.

The fixed electrode 3 is provided on the one surface (the upper surface) of the substrate 50 in a spaced-apart relationship with the driving electrode 2. The fixed electrode 3 is electrically connected to the first wiring lines 11 by making contact with the movable electrode 5. The fixed electrode 3 is also electrically connected to the corresponding the pixel electrode 8 through the conductive layer 6.

A constituent material of the fixed electrode 3 is not particularly limited insofar as it has conductivity. For example, the same material as the constituent materials of the first wiring lines 11 and the second wiring lines 12 can be used as the constituent material of the fixed electrode 3.

The thickness of the fixed electrode 3 is not particularly limited and may be preferably in the range of about 10 to 1000 nm and more preferably in the range of about 50 to 500 nm.

The movable electrode 5 is formed to laterally protrude from each of the first wiring lines 11 and is provided to oppose the driving electrode 2 and the fixed electrode 3.

The movable electrode 5 is of a strip-like shape and is fixed and cantilevered at one longitudinal end thereof near the first insulation layer 4 (at the left end in FIG. 3). Therefore, a free end 52 of the movable electrode 5 is displaceable toward the driving electrode 2 and the fixed electrode 3 (namely, in a downward direction in FIGS. 3 and 5). In this manner, the movable electrode 5 is displaceably provided so that it can come into contact with or move away from the fixed electrode 3.

A constituent material of the movable electrode 5 is not particularly limited insofar as it has conductivity and elastic deformability. Examples of the constituent material of the movable electrode 5 include: a silicon material such as monocrystalline silicon, polycrystalline silicon, amorphous silicon and silicon carbide; a metallic material such as stainless steel, titanium and aluminum; a composite material containing one or more of these materials in combination; and the like.

In the present embodiment, the driving electrode 2, a part of the fixed electrode 3 and a part of the movable electrode 5 (e.g. free end 52) are received within the receiving portion 13 formed between the pixel electrode 8 and the substrate 50. The interior of the receiving portion 13 may be in a vacuum state or may be filled with a non-oxidative gas or an insulating liquid.

With the switching element 1 set forth above, when no voltage is applied between the movable electrode 5 and the driving electrode 2, the movable electrode 5 is kept spaced apart from the fixed electrode 3 as illustrated in FIGS. 3 and 4 so that supply of an electric current from the first wiring lines 11 to the pixel electrode 8 can be interrupted.

If the voltage is applied to between the movable electrode 5 and the driving electrode 2, an electrostatic attraction force is generated between the movable electrode 5 and the driving electrode 2. Thus, the movable electrode 5 comes into contact with the fixed electrode 3 as illustrated in FIG. 5 so that an electric current can be supplied from the first wiring lines 11 to the pixel electrode 8.

The switching elements 1 mechanically operated in this manner are superior in light resistance to a thin film transistor. As a result, the light resistance of the electro-optical display device 100 as a whole is improved by the synergistic effect combined with the effect provided by the below-mentioned shutter unit 30.

The switching elements 1 are free from any light leakage that would occur in a thin film transistor. Therefore, there is no need to provide a light blocking layer, such as a black matrix or the like, which would otherwise be needed to block light in the switching elements 1. It is also possible to increase the aperture ratio in the active matrix unit 10.

Furthermore, since the switching elements 1 do not suffer from any temperature-dependent change in characteristics thereof, it is possible to simplify a cooling mechanism of the active matrix unit 10. In addition, the switching elements 1 can perform their switching operation at a higher speed than a thin film transistor does.

As described above, the movable electrode 5 is cantilevered so that the free end 52 thereof can be displaced. The fixed electrode 3 is provided to oppose the free end 52 of the movable electrode 5, whereas the driving electrode 2 is provided to oppose the portion of the movable electrode 5 nearer to the fixed end 51 as compared to the fixed electrode 3.

As shown in FIG. 5, the driving electrode 2, the fixed electrode 3 and the movable electrode 5 are arranged to ensure that the movable electrode 5 makes contact with the fixed electrode 3 while the movable electrode 5 and the driving electrode 2 are kept spaced apart from each other. This makes it possible to prevent the movable electrode 5 and the driving electrode 2 from being stuck together.

In other words, the driving electrode 2, the fixed electrode 3 and the movable electrode 5 constitute a sticking prevention means for preventing the driving electrode 2 and the movable electrode 5 from being stuck together.

Since each of the switching elements 1 mechanically operated in this manner includes the sticking prevention means for preventing the driving electrode 2 and the movable electrode 5 from being stuck together, the active matrix unit 10 can enjoy enhanced reliability together with the increased aperture ratio.

In particular, it is possible to simplify structure of the switching element 1 by allowing the movable electrode 5 to have a cantilevered structure as mentioned above. Furthermore, since the driving electrode 2 is arranged to oppose the portion of the movable electrode 5 nearer to the fixed end 51, the movable electrode 5 displaced (flexurally deformed) toward the driving electrode 2 tends to return to its original state with an increased reaction force. This makes it possible to surely prevent the driving electrode 2 and the movable electrode 5 from being stuck together.

A shutter unit 30 is bonded to the upper surface (the opposite surface from the substrate 50) of the sealing layer 9 of the active matrix unit 10 set forth above.

Shutter Unit

As shown in FIG. 1, the shutter unit 30 includes a base (or a black matrix) 31, a first intermediate layer 32, an electrode layer 33, a second intermediate layer 34 and a protective layer 35, which are laminated one atop another in the named order.

Referring to FIG. 6 which is a plan view of the shutter unit 30, a plurality of window portions 31a are formed in the base 31. In the electrode layer 33, there are provided a plurality of movable plates (shutter members) 33a in a corresponding relationship with the window portions 31a. Each of the movable plates 33a is adapted to open and close the corresponding one of the window portions 31a.

Hereinafter, individual parts of the shutter unit 30 will be described in detail one by one.

As shown in FIG. 6, the base 31 has the plurality of window portions 31a extending along the first wiring lines 11. In the present embodiment, each of the window portions 31a is of a strip-like shape when the shutter unit 30 is seen in a plan view.

In the present embodiment, when the shutter unit 30 is seen in a plan view, four window portions 31a are arranged in the region of the base 31 surrounded by two neighboring first wiring lines 11 and two neighboring second wiring lines 12 (hereinafter referred to as a "pixel region"). In other words, four window portions 31a are provided in a corresponding relationship with each of the switching elements 1.

The shutter unit 30 includes a plurality of shutter subunits. Each of the plurality of shutter subunits has the four window portions 31a which are provided in the corresponding relationship with each of the switching elements 1 as described above. The shutter subunit is also provided in the pixel region as shown in FIG. 6. Further, the shutter subunit also has two pair of movable plates 33a provided above two pair of window portions 31a of the four window portions 31a, and two fixed electrodes 33b, respectively, provided between the pair of window portions 31a, which will be described below.

Each of the window portions 31a is an opening formed by partially removing the base 31 and is configured to allow the light L to pass therethrough. Each of the window portions 31a is not limited to the illustrated example but may have any other construction insofar as the light L can be transmitted therethrough.

For example, each of the window portions 31a may be formed of a transparent material such as a resin material or a glass material (in other words, the opening that forms each of the window portions 31a may be filled with the transparent material).

The portion of the base 31 other than the window portions 31a has a light shielding property and constitutes a light shielding portion. That is to say, the light shielding portion of the base 31 is provided contiguous to the window portions 31a. Such a portion of the base 31 serves as a black matrix.

A constituent material of the base 31 (except the window portions 31a) is not particularly limited insofar as it has light shielding property in a wavelength band of the light L used.

Examples of the constituent material of the base 31 include: a silicon material such as monocrystalline silicon, polycrystalline silicon, amorphous silicon and silicon carbide; a metallic material such as stainless steel, titanium and aluminum; a glass material such as quartz glass, silicate glass (quartz glass), silicate alkali glass, soda-lime glass, potassium carbonate-lime glass, lead (alkali) glass, barium glass and borosilicate glass; a ceramic material such as alumina, zirconia, ferrite, silicon nitride, aluminum nitride, boron nitride, titanium nitride, silicon carbide, boron carbide, titanium carbide and tungsten carbide; a carbon material such as graphite and the like; a resin material such as polyolefin including polyethylene, polypropylene, ethylene-propylene copolymer and ethylene-vinyl acetate copolymer (EVA), cyclic polyolefin, modified polyolefin, polyvinyl chloride, polyvinylidene chloride, polystyrene, polyamide, polyimide, polyamide-imide, polycarbonate, poly-(4-methylpentene-1), ionomer, an acryl-based resin, polymethylmethacrylate, an acrylonitrile-butadiene-styrene copolymer (ABS resin), an acrylonitrile-styrene copolymer (AS resin), a butadiene-styrene copolymer, polyoxymethylene, polyvinyl alcohol (PVA), an ethylene-vinyl alcohol copolymer (EVOH), polyester including polyethylene terephthalate (PET), polyethylene naphthalate, polybutylene terephthalate (PBT) and polycyclohexane terephthalate (PCT), polyether, polyether ketone (PEK), polyether ether ketone (PEEK), polyether imide, polyacetal (POM), polyphenylene oxide, modified polyphenylene oxide, a modified polyphenylene ether resin (PBO), polysulfone, polyether sulfone, polyphenylene sulfide (PPS), polyarylate, aromatic polyester (liquid crystal polymer), polytetrafluoroethylene, polyvinylidene fluoride, a fluorine-based resin, various kinds of thermoplastic elastomers including a styrene-based elastomer, a polyolefin-based elastomer, a polyvinyl chloride-based elastomer, a polyurethane-based elastomer, a polyester-based elastomer, a polyamide-based elastomer, a polybutadiene-based elastomer, a trans-polyisoprene-based elastomer, a fluororubber-based elastomer and a chlorinated polyethylene-based elastomer, an epoxy resin, a phenol resin, an urea resin, a melamine resin, an aramid-based resin, unsaturated polyester, a silicon resin, polyurethane, copolymers, blends and polymer alloys, the latter three of which are mainly constituted of the above-noted materials; and a composite material containing one or more of the above-noted materials in combination.

In the case where a transparent material is used as the constituent material of the base 31, it may be possible to use a material having light shielding property, such as pigment or dye, in combination with the transparent material (e.g., by a mixing method or a coating method).

Depending on the wavelength band of the light L used, a black color material such as carbon black, black dye or black pigment is preferably used as the constituent material of the base 31.

The electrode layer 33 is bonded to the upper surface (the opposite surface from the sealing layer 9) of the base 31 through the first intermediate layer 32 (see FIGS. 1 and 8).

The first intermediate layer 32 serves as a spacer for keeping the movable plates 33a and the base 31 spaced apart in the thickness direction (i.e., in the up-and-down direction). The second intermediate layer 34 serves as a spacer for keeping the movable plates 33a and the protective layer 35 spaced apart in the thickness direction (i.e., in the up-and-down direction).

As shown in FIG. 7 and FIG. 8, when the shutter unit 30 is seen in a plan view, the first intermediate layer 32 and the second intermediate layer 34 are formed in those regions other than regions corresponding to the below-mentioned support portions 33c1 and 33c2 and regions corresponding to a main body of the below-mentioned fixed electrode 33b (i.e., portion of the fixed electrode 33b excluding the comb electrodes 33b1).

Therefore, in FIG. 1, the movable plates 33a and the fixed electrode 33b are spaced apart from the base 31 by a distance corresponding to the thickness of the first intermediate layer 32, thus creating a gap between them and the base 31. Likewise, the movable plates 33a and the fixed electrode 33b are spaced apart from the protective layer 35 by a distance corresponding to the thickness of the second intermediate layer 34, thus creating a gap between them and the protective layer 35. This allows the movable plates 33a to be displaced smoothly.

The protective layer 35 serves to protect the electrode layer 33. The protective layer 35 may be omitted. A constituent material of the protective layer 35 is not particularly limited and may be, e.g., the same as the constituent material of the sealing layer 9.

As shown in FIG. 7, the electrode layer 33 includes movable plates 33a for openably closing the window portions 31a, a fixed electrode 33b and support portions 33c1 and 33c2 fixedly secured to the base 31, a pair of elastic members 33d1 for interconnecting one end of each of the movable plates 33a and the support portion 33c1, and a pair of elastic members 33d2 for interconnecting the other end of each of the movable plates 33a and the support portion 33c2.

As shown in FIG. 6, the electrode layer 33 (shutter unit 30) includes a plurality of repeating units (shutter subunits), in which each repeating unit has four window portions 31a. More specifically, as shown in FIG. 7, in a pair of two window portions 31a of each of the repeating units, two movable plates 33a are opposed to each other with the fixed electrode 33b interposed therebetween and the two window portions 31a are arranged symmetrically in the left-and-right direction with respect to the fixed electrode 33b.

Each of the movable plates 33a is arranged to cover the corresponding one of the window portions 31a when not in operation. Furthermore, each of the movable plates 33a has an elongated shape and extends along the length of the corresponding one of the window portions 31a.

In other words, when the shutter unit 30 is seen in a plan view, each of the movable plates 33a (the main body portions) has substantially the same shape as (a similar shape to) each of the window portions 31a. This makes it possible to efficiently arrange the movable plates 33a and the window portions 31a. When the shutter unit 30 is seen in a plan view, each of the movable plates 33a is formed to have an area slightly greater than that of each of the window portions 31a.

Each of the movable plates 33a includes a comb electrode 33a1 (a movable plate electrode) having a number of teeth formed on one lateral side thereof (on the side facing toward the fixed electrode 33b).

Each of the movable plates 33a is supported at one end thereof on the support portion 33c1 by the pair of elastic members 33d1 and is supported at the other end thereof on the support portion 33c2 by the pair of elastic members 33d2.

Thus, the movable plates 33a are displaceable with respect to the window portions 31a so that each of them can open and close the corresponding one of the window portions 31a.

More specifically, the movable plates 33a are displaceable in the transverse direction thereof (left-and-right direction in FIG. 7).

The window portions 31a are closed when the movable plates 33a are positioned over the window portions 31a (as shown in FIG. 7) but are opened when the movable plates 33a are positioned over the light shielding portion near the window portions 31a (as shown in FIG. 9). By arranging the movable plates 33a so that they can displace along the surface of the base 31 in this manner, it becomes possible for the movable plates 33a to open and close the window portions 31a with a relatively simple construction.

Each of the support portions 33c1 and 33c2 is bonded to the base 31 through the first intermediate layer 32. Thus, each of the support portions 33c1 and 33c2 is fixedly secured to the base 31 in a spaced-apart relationship therewith.

Although not shown in the drawings, each of the support portions 33c1 and 33c2 is grounded through a penetrating electrode portion (may be electrically connected to a common electrode for maintaining the movable plates 33a to the same potential, respectively). Thus, the movable plates 33a (the comb electrodes 33a1) are kept grounded. Therefore, a potential difference occurs between the movable plates 33a and the fixed electrodes 33b which will be described below.

Each of the elastic members 33d1 and 33d2 is elastically deformable. In the present embodiment, each of the elastic members 33d1 and 33d2 has a generally "Z"-like bent portion. This makes it possible to increase the elastic deformation amount of each of the elastic members 33d1 and 33d2.

The fixed electrode 33b has a pair of comb electrodes 33b1 (base electrodes) having a number of teeth that can mesh with the teeth of the respective comb electrodes 33a1 of the movable plates 33a with a gap left therebetween. Although not shown in the drawings, the fixed electrode 33b is electrically connected to the corresponding one of the pixel electrode 8 of the switching element 1.

Thus, there is provided a driving means by which the movable plates 33a are displaced to bring the window portions 31a into an opening state or a closing state when a voltage is applied to between the fixed electrode 33b and the movable plates 33a. In other words, the shutter unit 30 electrostatically switches the movable plates 33a to bring the window portions 31a into the opening state or the closing state.

A constituent material of the electrode layer 33 is not particularly limited insofar as it allows the movable plates 33a to open and close the window portions 31a and it has conductivity and elastic deformability.

Examples of the constituent material of the electrode layer 33 include: a silicon material such as monocrystalline silicon, polycrystalline silicon, amorphous silicon and silicon carbide; a metallic material such as stainless steel, titanium and aluminum; a composite material containing one or more of these materials in combination; and the like. Among them, it is preferable to use the silicon material.

In the case where the silicon material is used as the constituent material of the electrode layer 33, the electrode layer 33 can be formed by, e.g., sputtering an Al—Si (2%) material and an α-Si (amorphous silicon), annealing them at a temperature of about 300° C. to thereby perform crystallization of a silicon monocrystalline film in a lower layer through the Al—Si material, etching away the Al—Si material moved to an upper layer to thereby form a silicon monocrystalline film and then etching the silicon monocrystalline film.

In this regard, it is to be noted that since the electrode layer 33 includes the movable plates 33a, the fixed electrode 33b, the support portions 33c1 and 33c2, the pair of elastic members 33d1, and the pair of elastic members 33d2, they are constituted of the constituent material having conductivity and elastic deformability as described above.

Now, a description will be made on the operation of the shutter unit 30.

When each of the switching elements 1 is in an off-state, no voltage is applied to between the comb electrodes 33a1 and the comb electrodes 33b1 (between a pair of electrodes). As shown in FIG. 7, the movable plates 33a are positioned so as to cover the window portions 31a, respectively. That is to say, the movable plates 33a bring the window portions 31a into the closing state.

On the other hand, when each of the switching elements 1 comes into an on-state, a voltage is applied to (a potential difference occurs) between the comb electrodes 33a1 and the comb electrodes 33b1, thereby generating an electrostatic attraction force between the electrodes.

In response, the movable plates 33a are displaced toward the fixed electrode 33b against the biasing forces (resilient forces) of the respective elastic members 33d1 and 33d2. Namely, the movable plates 33a are moved from above the window portions 31a to the positions as illustrated in FIG. 9. That is to say, the movable plates 33a bring the window portions 31a into the opening state.

If each of the switching elements 1 gets back to the off-state, the movable plates 33a are restored or returned to an original state (closing state) by the biasing forces (resilient forces) of the respective elastic members 33d1 and 33d2. During this driving process, an opening and closing degree of the window portions 31a can be adjusted by controlling the voltage applied to between the pair of electrodes (comb electrodes 33a1 and comb electrodes 33b1). This makes it possible to realize multiple-tone or analog driving.

Since the shutter unit 30 described above is provided with the elastic members 33d1 and 33d2 that serve as biasing members for biasing the movable plates 33a into the opening state or the closing state, it is not necessary for the driving means to apply a driving force to the movable plates 33a when the movable plates 33a are kept in one of the opening state and the closing state. This assists in saving electric power.

Although the biasing members may be formed independently of the movable plates 33a, use of the elastically deformable elastic members 33d1 and 33d2 in supporting the movable plates 33a ensures that the elastic members 33d1 and 33d2 can possess both a function of supporting the movable plates 33a and a function of biasing them.

Since the movable plates 33a and the elastic members 33d1 and 33d2 can be integrally formed to have increased mechanical strength, it is possible to enhance reliability of the electro-optical display device 100. In addition, the movable plates 33a and the elastic members 33d1 and 33d2 can be collectively formed in the same substrate or the same layer.

Owing to the fact that the movable plates 33a can be electrostatically switched between the opening state and the closing state as set forth above, it becomes possible to simplify the construction of the driving means. This reduces a number of constituent parts of the driving means and occurrence of trouble in the driving means.

Particularly, use of the comb electrodes makes it possible to increase areas of opposing surfaces between the pair of electrodes (the comb electrodes 33a1 and 33b1), thereby making greater an electrostatic attraction force generated between the pair of electrodes.

The window portions 31a and the movable plates 33a corresponding thereto are provided in plural numbers (four in the present embodiment) in each of the switching elements 1. For that reason, even if one of the four movable plates 33a in each of the switching elements 1 gets out of order, the remaining movable plates 33a continue to normally operate, thereby making it possible to prevent generation of a defective pixel.

In other words, it is possible to increase the redundancy of the electro-optical display device 100. Moreover, it is possible to reduce the size (mass) of each of the movable plates 33a, consequently increasing a switching speed (responsiveness) at which the movable plates 33a are switched between the opening state and the closing state.

The shutter unit 30 described above is designed to mechanically transmit or intercept the light L and therefore is exceptionally superior in its light shielding property, as compared to a liquid crystal shutter. That is to say, the shutter unit 30 is capable of exercising superior shutter characteristics for an extended period of time even if the light L used is quite intensive.

Microlens Array

Referring to FIG. 1, the microlens array (or the microlens substrate) 20 is bonded to the lower surface of the substrate 50 of the active matrix unit 10, whereas the microlens array 40 is bonded to the upper surface of the protective layer 35 of the shutter unit 30.

The microlens array 20 includes a microlens holding substrate (a first substrate) 201 having a plurality of (a multiplicity of) concave portions (microlens-receiving concave portions) 201a with concave surfaces and a resin layer (or an adhesive agent layer) 202 bonded to the surface of the microlens holding substrate 201 on which the concave portions 201a are formed. The resin layer 202 has a plurality of microlenses 202a formed of the resin filled in the respective concave portions 201a.

The microlenses 202a are provided in a corresponding relationship with the window portions 31a. That is to say, each of the microlenses 202a has an optical axis Q passing through substantially the center of each of the window portions 31a as shown in FIG. 1.

Similarly, the microlens array 40 includes a microlens holding substrate (a second substrate) 401 having a plurality of (a multiplicity of) concave portions (microlens-receiving concave portions) 401a with concave surfaces and a resin layer (or an adhesive agent layer) 402 bonded to the surface of the microlens holding substrate 401 on which the concave portions 401a are formed. The resin layer 402 has a plurality of microlenses 402a formed of the resin filled in the respective concave portions 401a.

The microlenses 402a are provided in a corresponding relationship with the window portions 31a. That is to say, each of the microlenses 402a has an optical axis Q passing through substantially the center of each of the window portions 31a as shown in FIG. 1.

The microlenses 202a serve to focus the incident light L on the window portions 31a. This makes it possible to transmit the light L through the shutter unit 30 with no loss even if each of the window portions 31a has a light transmission region of reduced area (reduced aperture area). That is to say, it is possible to increase utilization efficiency of the light L.

Furthermore, the microlenses 402a serve to diverge or collimate the outgoing light L. Since the microlens arrays 20 and 40 are provided to oppose to each other through the shutter unit 30 and active matrix unit 10 in this manner, the light L departing from the electro-optical display device 100 can become parallel light. In this regard, it is to be noted that it may be possible to omit the microlens array 40.

Referring to FIG. 1, each of the microlenses 202a and the 402a has a generally hemispherical cross-sectional shape. Furthermore, each of the microlenses 202a and the 402a has an elongated shape in a plan view extending along each of the window portions 31a with a length generally equal to the length of each of the window portions 31a.

Thus, the respective microlenses 202a are capable of effectively focusing the incident light L on a desired one of the window portions 31a. Likewise, the respective microlenses 402a are capable of effectively diverging or collimating and projecting the light L that comes from the desired one of the window portions 31a.

The respective microlenses 202a and 402a are not particularly limited in their shape insofar as they can perform the functions noted above. For example, the respective microlenses 202a and 402a may have an elongated shape extending over the nearly entire region of the substrate 50 along the first wiring lines 11 and may be in the form of a lenticular lens. Moreover, the respective microlenses 202a and 402a may have a circular shape in a plan view and may be arranged in plural numbers in each of the window portions 31a.

A constituent material of each of the microlens holding substrates 201 and 401 is not particularly limited, insofar as it has optical transparency. A glass material may preferably be used as the constituent material of each of the microlens holding substrates 201 and 401.

A constituent material of each of the resin layers 202 and 402 is not particularly limited, insofar as it has a refractive index differing from that of the constituent material of each of the microlens holding substrates 201 and 401 and has optical transparency. Various kinds of resin materials may be used as the constituent material of each of the resin layers 202 and 402.

By combining superior light resistance of the shutter unit 30 and the light collecting function of the microlenses 202a, the electro-optical display device 100 described above shows enhanced reliability and can perform display with increased light utilization efficiency.

Second Embodiment

Next, a description will be made on a second embodiment of an electro-optical display device according to the present invention.

Figure 10:
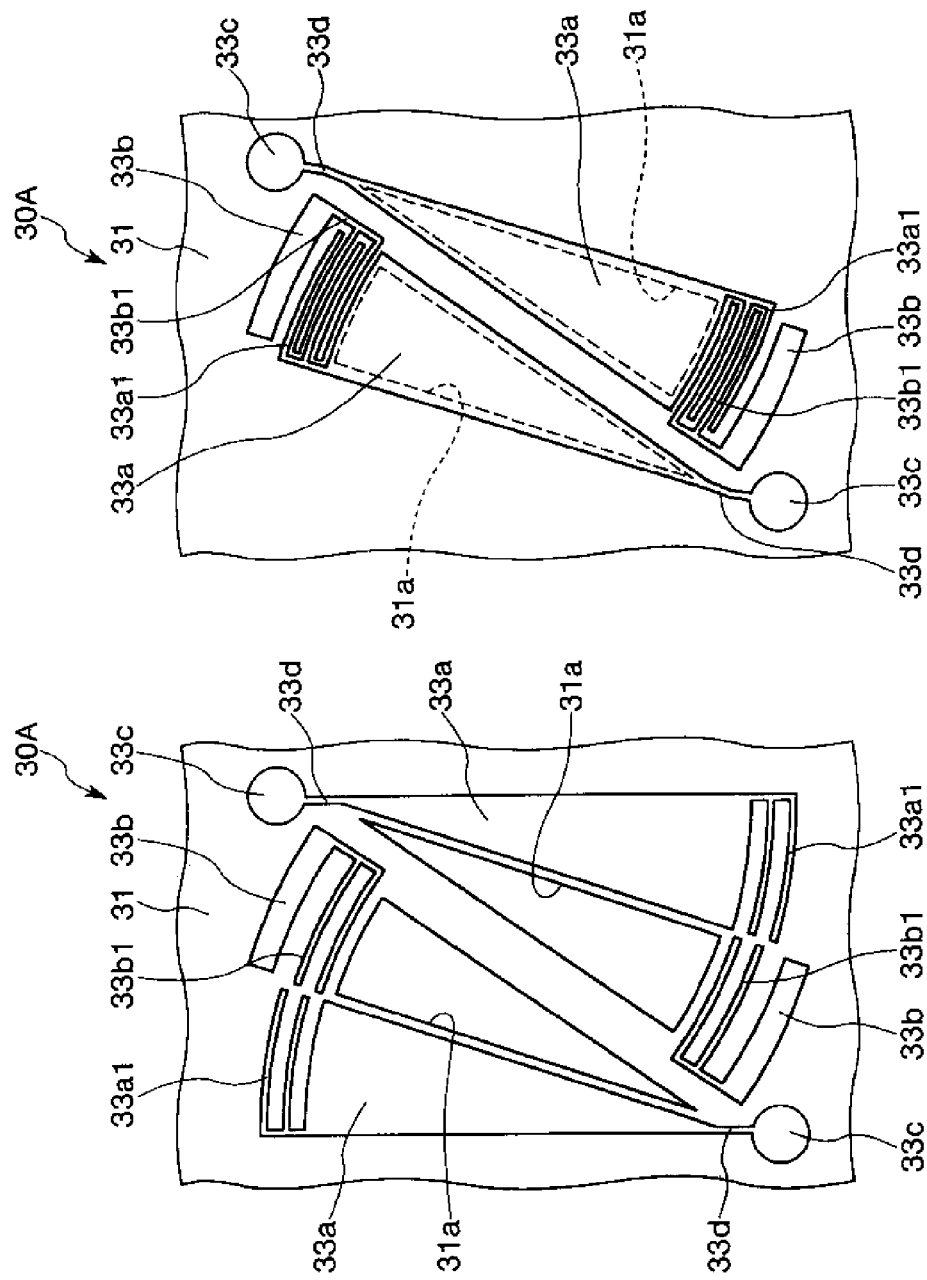
FIGS. 10A and 10B are plan views for explaining a shutter unit incorporated in an electro-optical display device in accordance with a second embodiment of the present invention.

FIGS. 10A and 10B are plan views for explaining a shutter unit incorporated in an electro-optical display device in accordance with a second embodiment of the present invention. FIG. 10A shows movable plates of the shutter unit in a closing state and FIG. 10B shows the movable plates of the shutter unit in an opening state. For the sake of convenience in the description, the front side of a drawing sheet in FIGS. 10A and 10B will be hereinafter referred to as "upper", the rear side as "lower", the right side as "right" and the left side as "left".

Hereinafter, the electro-optical display device of the second embodiment will be described with emphasis placed on points differing from the electro-optical display device of the first embodiment. The same matters will be omitted from the description.

The electro-optical display device of the present embodiment is the same as the electro-optical display device of the first embodiment, except the difference in the structure of the shutter unit.

As shown in FIGS. 10A and 10B, each of the window portions 31a employed in the shutter unit 30A of this second embodiment has a generally triangular shape in a plan view (the shape of an acute-angled isosceles triangle). In this embodiment, two neighboring window portions 31a are arranged so that the apexes thereof can lie in a mutually opposite relationship. In this regard, it should be understood that the two neighboring window portions 31a correspond to the two neighboring window portions 31a of the first embodiment set forth above.

The shutter unit 30A includes movable plates 33a for openably closing the window portions 31a, fixed electrodes 33b and support portions 33c fixedly secured to the base 31 and elastic members 33d for interconnecting the movable plates 33a and the support portions 33c.

Each of the movable plates 33a is arranged to move from the corresponding one of the window portions 31a when not in operation. Furthermore, when the shutter unit 30A is seen in a plan view, each of the movable plates 33a has the shape of an acute-angled isosceles triangle in conformity with the corresponding one of the window portions 31a.

In other words, when the shutter unit 30A is seen in a plan view, each of the movable plates 33a (main body portions) has substantially the same shape as the corresponding window portion 31a. This makes it possible to efficiently arrange the movable plates 33a and the window portions 31a.

Each of the movable plates 33a has a comb electrode 33a1 (a movable plate electrode) having a plurality of teeth formed in the bottom side portion thereof (on the side near the fixed electrode 33b).

The movable plates 33a are supported on the support portions 33c through the elastic members 33d. Thus, each of the movable plates 33a is displaceable with respect to the base 31 so that it can open and close the corresponding the window portion 31a.

More specifically, when the shutter unit 30A is seen in a plan view, each of the movable plates 33a is rotatable about an apex portion into a position where it is placed over the corresponding window portion 31a to bring the same into a closing state or a position where it is placed over the light shielding portion near the corresponding window portion 31a to bring the same into an opening state.

By rotating the movable plates 33a in this manner, it is possible to displace the movable plates 33a along the surface of the base 31. This makes it possible for the movable plates 33a to open and close the window portions 31a with a relatively simple structure.

Each of the support portions 33c is bonded to the base 31 through the first intermediate layer 32. Thus, each of the support portions 33c is fixedly secured to the base 31 in a spaced-apart relationship therewith.

Although not shown in the drawings, each of the support portions 33c is grounded through a penetrating electrode portion (electrically connected to a common electrode). Thus, the movable plates 33a (the comb electrodes 33a1) are kept grounded.

Each of the elastic members 33d is elastically deformable. In the present embodiment, each of the elastic members 33d is formed into a rod-like shape. Thus, the movable plates 33a can be rotated by flexurally deforming the respective elastic members 33d.

Each of the fixed electrodes 33b has a comb electrode 33b1 (base electrodes) provided near the bottom side of each of the window portions 31a and having a plurality of teeth that can mesh with the teeth of the comb electrode 33a1 of each of the movable plates 33a with a gap left therebetween. Although not shown in the drawings, each of the fixed electrodes 33b is electrically connected to the corresponding one of the pixel electrodes 8 of the switching elements 1.

Thus, there is provided a driving means by which the movable plates 33a are displaced to bring the window portions 31a into the opening state or the closing state when a voltage is applied to between the fixed electrodes 33b and the movable plates 33a. In other words, the shutter unit 30A electrostatically switches the movable plates 33a to bring the window portions 31a into the opening state or the closing state.

Now, a description will be made on the operation of the shutter unit 30A.

When each of the switching elements 1 is in an off-state, no voltage is applied to between the comb electrodes 33a1 and the comb electrodes 33b1 (between a pair of electrodes). As shown in FIG. 10A, in this state, the movable plates 33a are positioned over the light shielding portion near the window portions 31a. That is to say, the movable plates 33a bring the window portions 31a into the opening state.

On the other hand, if each of the switching elements 1 comes into an on-state, a voltage is applied to (a potential difference occurs) between the comb electrodes 33a1 and the comb electrodes 33b1, thereby generating an electrostatic attraction force between the electrodes (the comb electrodes 33a1 and the comb electrodes 33b1).

In response, the movable plates 33a are displaced toward the fixed electrodes 33b against the biasing forces (resilient forces) of the elastic members 33d. Then, they are positioned to cover the window portions 31a as illustrated in FIG. 10B. That is to say, the movable plates 33a bring the window portions 31a into the closing state.

If each of the switching elements 1 gets back to the off-state, the movable plates 33a are restored or returned to an original state (opening state) by the biasing forces (resilient forces) of the elastic members 33d. The electro-optical display device 100 of the second embodiment described above is capable of providing the same effects as those that are available in the electro-optical display device 100 of the first embodiment.

In this regard, in this second embodiment, the microlenses may have a plan-view shape corresponding to the plan-view shape of the window portions 31a.

Electronic Device

Next, electronic devices provided with the electro-optical display device 100 will be described as examples of an electronic device according to the present invention, with reference to first to fourth examples shown in FIGS. 11 through 14.

First Example

Figure 11:
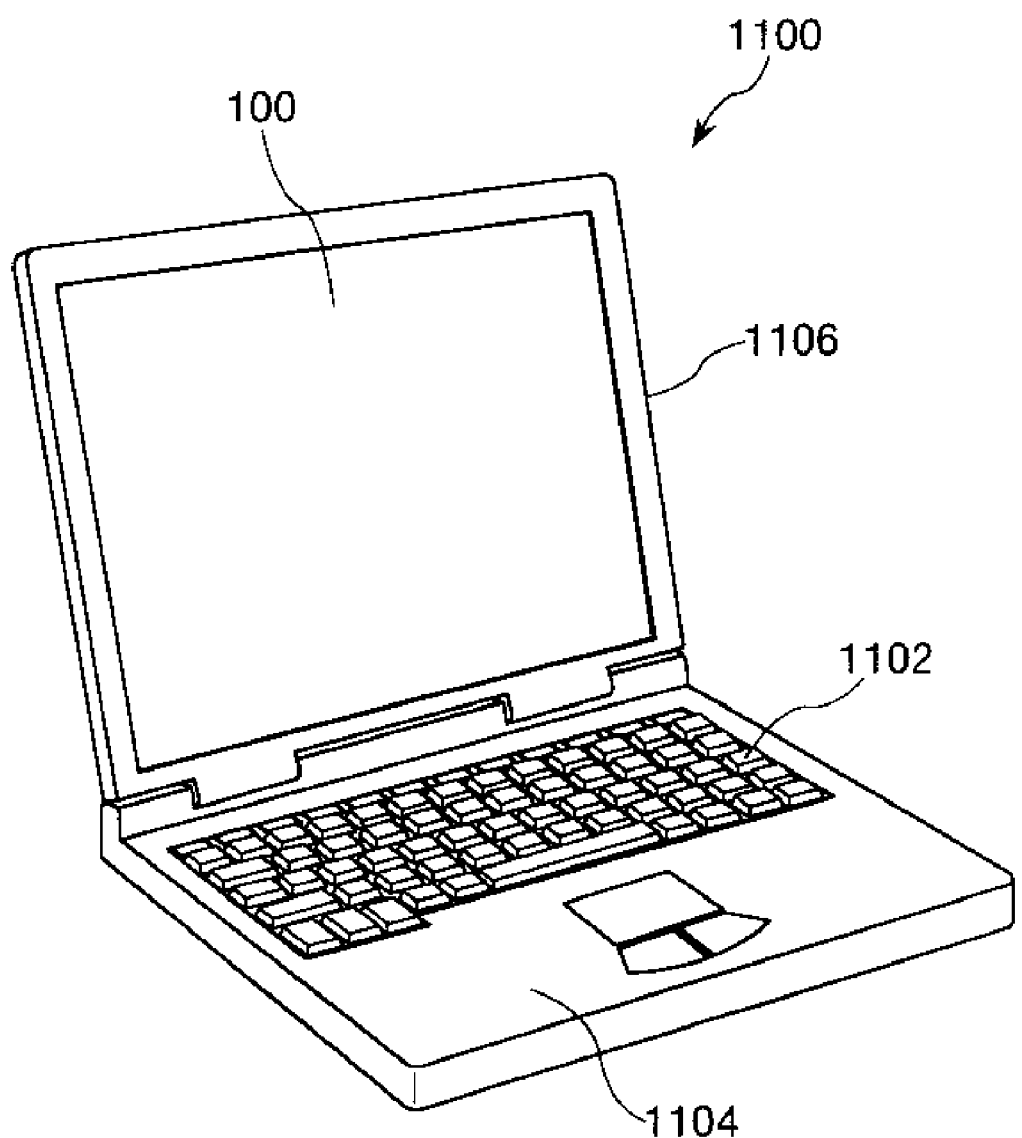
FIG. 11 is a perspective view showing a mobile (notebook type) personal computer which is a first example of an electronic device according to the present invention.

FIG. 11 is a perspective view showing a mobile (notebook type) personal computer which is a first example of the electronic device according to the present invention.

As shown in this figure, a personal computer 1100 includes a main body portion 1104 with a keyboard 1102 and a display unit 1106. The display unit 1106 is rotatably supported on the main body portion 1104 by means of a hinge structure portion.

In this personal computer 1100, the display unit 1106 includes the electro-optical display device 100 described above and a backlight not shown in the drawings. The display unit 1106 is capable of displaying an image (information) by allowing the light emitted from the backlight to pass through the electro-optical display device 100.

Second Example

Figure 12:
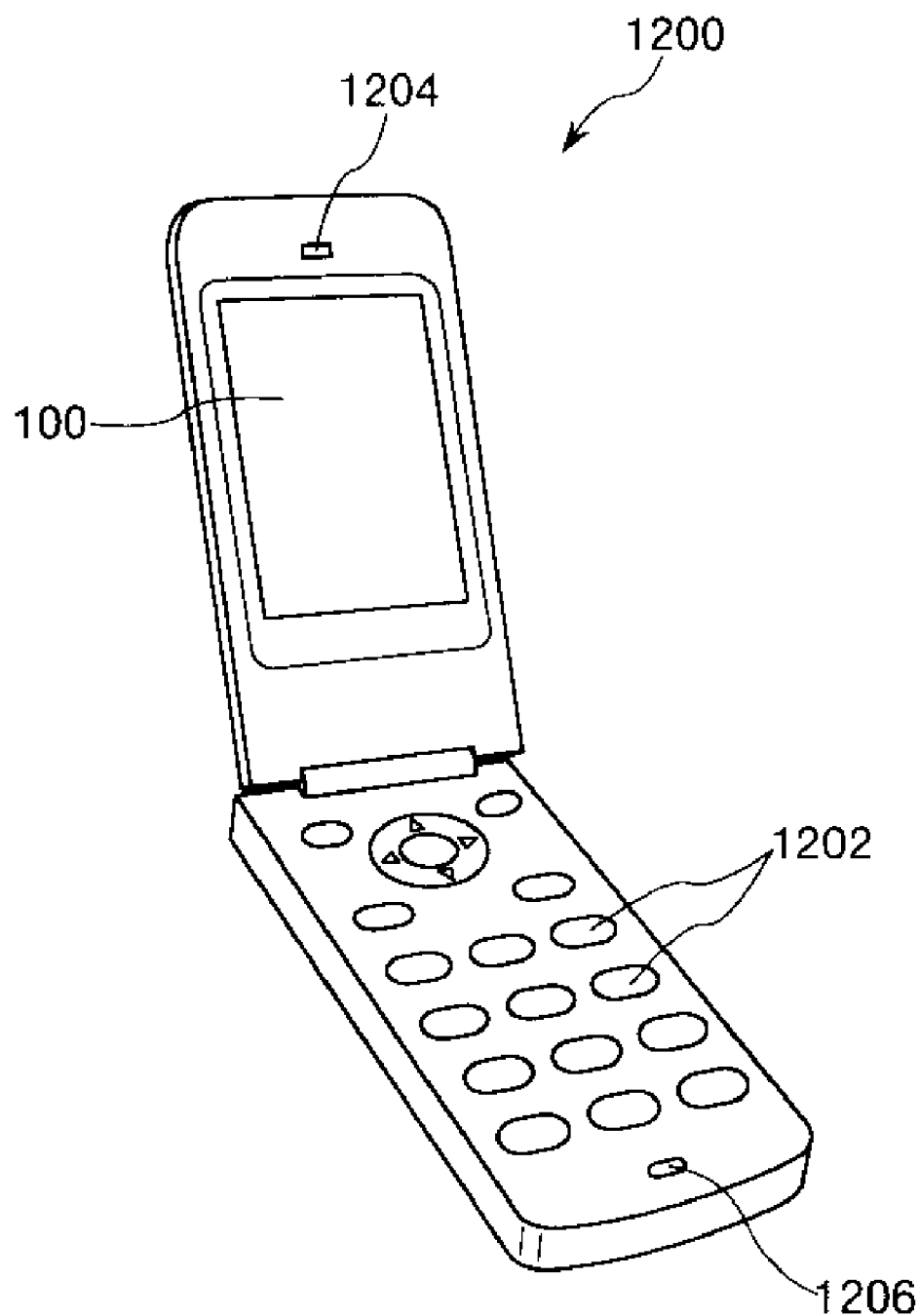
FIG. 12 is a perspective view showing a cellular phone (including a PHS) which is a second example of the electronic device according to the present invention.

FIG. 12 is a perspective view showing a cellular phone (including a PHS) which is a second example of the electronic device according to the present invention.

As shown in this figure, a cellular phone 1200 includes a plurality of operation buttons 1202, an earpiece 1204, a mouthpiece 1206, the electro-optical display device 100 described above and a backlight not shown in the drawings.

Third Example

Figure 13:
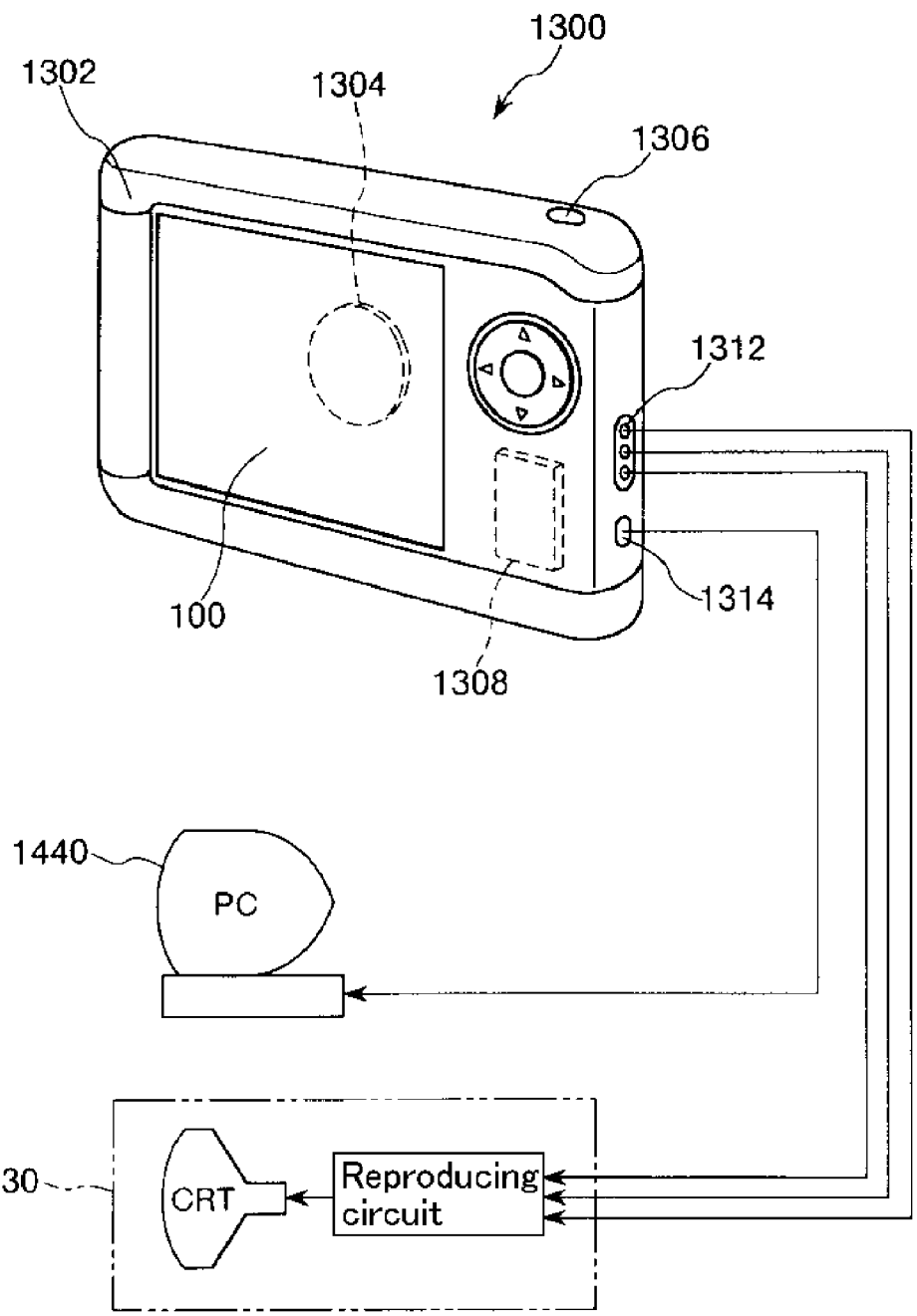
FIG. 13 is a perspective view showing a digital still camera which is a third example of the electronic device according to the present invention.

FIG. 13 is a perspective view showing a digital still camera which is a third example of the electronic device according to the present invention. Also schematically shown in this figure are external devices connected the digital still camera.

As opposed to a typical film camera that exposes a silver salt photography film to an optical image of an object, a digital still camera 1300 is designed to generate imaging signals (or image signals) by photoelectrically converting optical images of an object with an imaging element such as a CCD (Charged Coupled Device).

The digital still camera 1300 includes a case (or a body) 1302, on the rear surface of which the electro-optical display device 100 described above and a backlight not shown in the drawings are provided. The digital still camera 1300 is configured to display a visual image of the object using the imaging signals generated by the CCD. The electro-optical display device 100 serves as a finder that displays an electronic image of an object.

A circuit board 1308 is provided within the case 1302. A memory for storing the imaging signals is mounted on the circuit board 1308. On the front side (the rear side in the illustrated configuration) of the case 1302, there is provided a light receiving unit 1304 that includes an optical lens (an imaging optical system), a CCD and the like.

If a user confirms an object image displayed on the electro-optical display device 100 and presses a shutter button 1306, the imaging signals of the CCD available at that time are transferred to and stored in the memory of the circuit board 1308.

In this digital still camera 1300, a video signal output terminal 1312 and a data communication input/output terminal 1314 are provided on one side surface of the case 1302. As shown in FIG. 13, if necessary, a television monitor 1430 is connected to the video signal output terminal 1312 and a personal computer 1440 is connected to the data communication input/output terminal 1314.

Responsive to a specified operation, the imaging signals stored in the memory of the circuit board 1308 are outputted to the television monitor 1430 or the personal computer 1440.

Fourth Example

Figure 14:
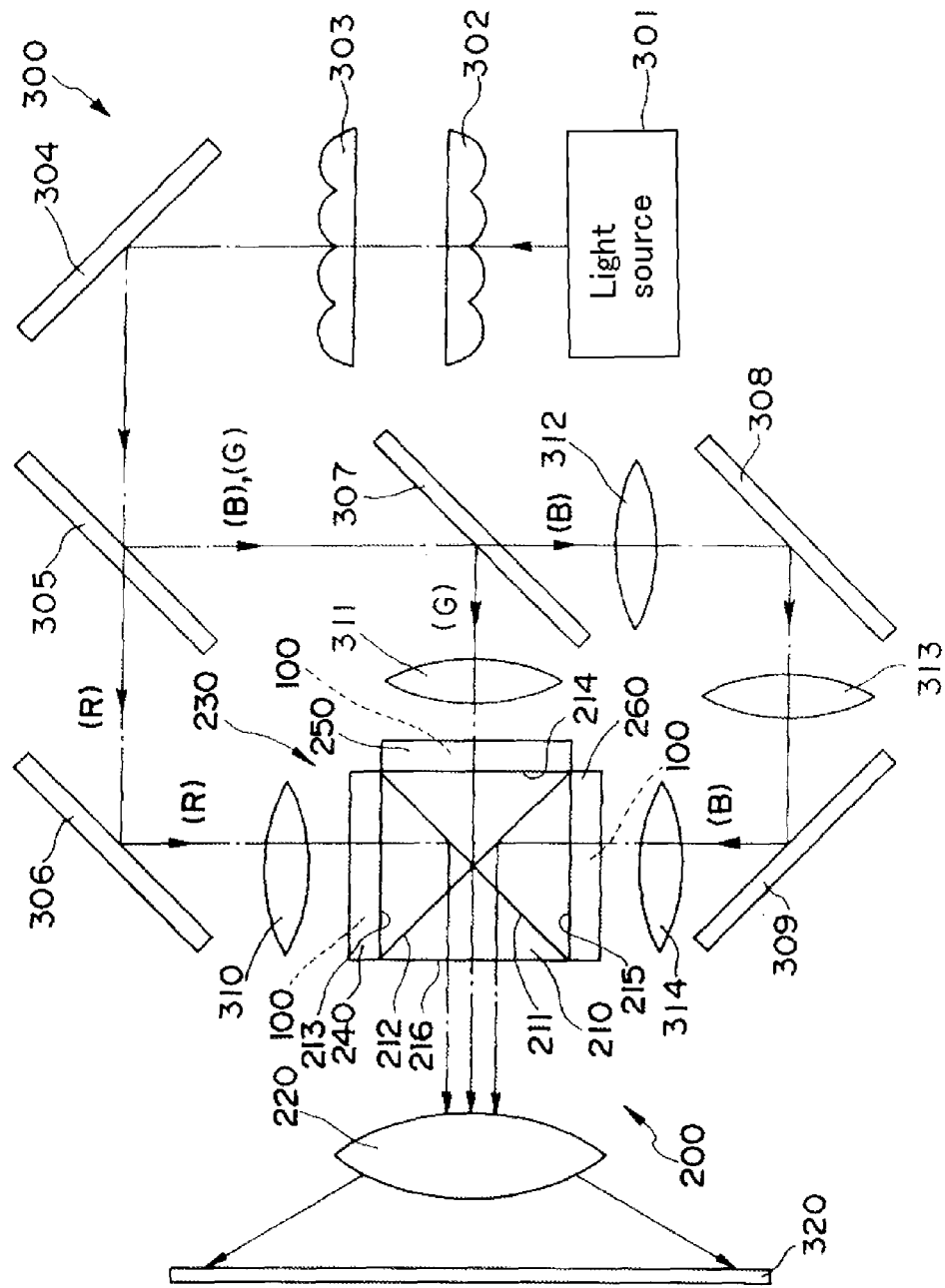
FIG. 14 is a view schematically showing an optical system of a projection type display device (i.e., a projector) which is a fourth example of the electronic device according to the present invention.

FIG. 14 is a view schematically showing an optical system of a projection type display device (i.e., a projector) which is a fourth example of the electronic device according to the present invention.

As shown in FIG. 14, the projection type display device 300 includes a light source 301, an illuminating optical system with a plurality of integrator lenses, a color-separating optical system (a light-guiding optical system) with a plurality of dichroic mirrors and the like, a light valve (or a light shutter array) 240 corresponding to a red color (for a red color), a light valve (or a light shutter array) 250 corresponding to a green color (for a green color), a light valve (or a light shutter array) 260 corresponding to a blue color (for a blue color), a dichroic prism (or a color-synthesizing optical system) 210 with a dichroic mirror surface 211 for reflecting only red light and a dichroic mirror surface 212 for reflecting only blue light, and a projection lens (or a projecting optical system) 220.

The illuminating optical system includes integrator lenses 302 and 303. The color-separating optical system includes mirrors 304, 306 and 309, a dichroic mirror 305 for reflecting the blue light and the green light (namely, for transmitting only the red light), a dichroic mirror 307 for reflecting only the green light, a dichroic mirror 308 for reflecting only the blue light (or a mirror for reflecting the blue light), and light collecting lenses 310, 311, 312, 313 and 314.

The light valve 250 is provided with the electro-optical display device 100 described above. The light valves 240 and 260 have the same structure as the light valve 250. The electro-optical display devices 100 with which the light valves 240, 250 and 260 are provided are respectively connected to a driving circuit not shown in the drawings.

In the projection type display device 300, the dichroic prism 210 and the projection lens 220 constitute an optical block 200. A display unit 230 is composed from the optical block 200 and the light valves 240, 250 and 260 fixedly secured to the dichroic prism 210.

Hereinafter, a description will be made on the operation of the projection type display device 300.

A white light (white light beam) emitted from the light source 301 passes through the integrator lenses 302 and 303. The intensity (brightness distribution) of the white light is made uniform by the integrator lenses 302 and 303. It is preferred that the white light emitted from the light source 301 has relatively high intensity. By doing so, it is possible to make clear the image formed on a screen 320.

Since the projection type display device 300 employs the electro-optical display device 100 which is superior in light resistance, it exhibits increased stability for an extended period of time even if the light emitted from the light source 301 has high intensity.

After passing through the integrator lenses 302 and 303, the white light is reflected to the left in FIG. 14 by means of the mirror 304. The blue light (B) and the green light (G) contained in the reflected light are reflected downwardly in FIG. 14 by means of the dichroic mirror 305, and the red light (R) alone passes through the dichroic mirror 305.

After passing through the dichroic mirror 305, the red light is reflected downwardly in FIG. 14 by means of the mirror 306. The red light thus reflected is shaped by the light collecting lens 310 and then is incident on the light valve 240 for a red color.

The green light reflected by the dichroic mirror 305 is reflected to the left in FIG. 14 by means of the dichroic mirror 307 but the blue light passes through the dichroic mirror 307. The green light reflected by the dichroic mirror 307 is shaped by the light collecting lens 311 and then is incident on the light valve 250 for a green color.

After passing through the dichroic mirror 307, the blue light is reflected to the left in FIG. 14 by means of the dichroic mirror (or a mirror) 308 and then reflected upwardly in FIG. 14 by means of the mirror 309. Such a blue light is shaped by the light collecting lens 312, 313, and 314 and then is incident on the light valve 260 for a blue color.

In the manner mentioned above, the white light emitted from the light source 301 is color-separated into three primary colors, i.e., red, green and blue colors, by means of the color-separating optical system. The red light, the green light and the blue light thus separated are guided to and incident on the corresponding light valves.

At this time, the respective pixels of the electro-optical display device 100 having the light valve 240 (i.e., the switching elements 1 and the pixel electrodes 8 connected thereto) are switchingly (or on-off) controlled or modulated by means of the driving circuit (driving means) operable in response to the image signals for a red color so that a red color image can be formed.

Similarly, the green light and the blue light are respectively incident on the light valves 250 and 260 and modulated by the corresponding electro-optical display devices 100 so that a green color image and a blue color image can be formed. At this time, the respective pixels of the electro-optical display device 100 having the light valve 250 are switchingly controlled by means of the driving circuit operable in response to the image signals for a green color.

The respective pixels of the electro-optical display device 100 having the light valve 260 are switchingly controlled by means of the driving circuit operable in response to the image signals for a blue color. In this manner, the red light, the green light and the blue light are respectively modulated by the light valves 240, 250 and 260 to form a red color image, a green color image and a blue color image.

The red color image formed by the light valve 240, i.e., the red light coming from the light valve 240, is incident on the dichroic prism 210 through the surface 213 and is reflected to the left in FIG. 14 by the dichroic mirror surface 211. Then, the red color image or the red light passes through the dichroic mirror surface 212 and goes out through the outgoing surface 216.

The green color image formed by the light valve 250, i.e., the green light coming from the light valve 250, is incident on the dichroic prism 210 through the surface 214. Then, the green color image or the green light passes through the dichroic mirror surfaces 211 and 212 and goes out through the outgoing surface 216.

The blue color image formed by the light valve 260, i.e., the blue light coming from the light valve 260, is incident on the dichroic prism 210 through the surface 215 and is reflected to the left in FIG. 14 by the dichroic mirror surface 212. Then, the blue color image or the blue light passes through the dichroic mirror surface 211 and goes out through the outgoing surface 216.

In this manner, the different kinds of light coming from the light valves 240, 250 and 260, i.e., the respective color images formed by the light valves 240, 250 and 260, are synthesized into a color image by the dichroic prism 210. The color image is projected (enlargedly projected) through the projection lens 220 on the screen 320 installed in a specified position.

The electronic device including the electro-optical display device 100 described above is capable of displaying a high quality image as well as exhibiting enhanced reliability.

The electronic device of the present invention is not limited to the personal computer (the movable personal computer) shown in FIG. 11, the cellular phone shown in FIG. 12, the digital still camera shown in FIG. 13 and the projection type display device shown in FIG. 14.

Other examples of the present electronic device include a television set, a video camera, a viewfinder type or monitor viewing type video tape recorder, a car navigation system, a pager, an electronic diary (with a communication function), an electronic dictionary, an electronic calculator, an electronic game device, a word processor, a workstation, a picture phone, a television monitor for security, an electronic binocular telescope, a POS terminal, a device provided with a touch panel (e.g., a cash dispenser of a banking institution or an automatic ticket bending machine), a medical instrument (e.g., an electronic thermometer, a sphygmomanometer, a blood glucose gauge, an electrocardiography display device, an ultrasonograph or a display device for endoscopes), a fish detector, various kinds of measuring instruments, meters and gauges (e.g., for cars, airplanes or ships), and a flight simulator.

It goes without saying that the electro-optical display device of the present invention described above can be used as a display or a monitor for the electronic devices noted above. The electronic device including the electro-optical display device 100 described above exhibits enhanced reliability.

While the electro-optical display device and the electronic device according to the present invention have been described hereinabove with reference to the illustrated embodiments, the present invention is not limited thereto.

For example, the configurations of the respective parts employed in the electro-optical display device and the electronic device of the present invention may be replaced by other arbitrary configurations having equivalent functions. It may also be possible to add other optional elements to the present invention.

Although the movable plates 33*a* are displaced by the electrostatic driving method using a pair of comb-like electrodes in the foregoing embodiments, the shape of the electrodes is not limited thereto. For example, the pair of electrodes may be formed of parallel flat plates.

Although the electrostatic driving method is used a driving method for displacing the movable plates 33*a* in the foregoing embodiments, the present invention is not limited thereto. As an alternative example, it may be possible to use, e.g., a piezoelectric driving method, an electromagnetic driving method or other driving methods.

Needless to say, the number, the shape, the arrangement and the size of each of the window portions and the movable plates are not limited to the ones employed in the foregoing embodiments. For example, the numbers of the window portions and the movable plates corresponding to each of the switching elements may be one to three or five or more.

It is also needless to say that the number, the shape, the arrangement and the size of the elastic members are not limited to the ones employed in the foregoing embodiments.

Although the projection type display device (electronic device) of the foregoing embodiments includes three electro-optical display devices, all of which are formed of the electro-optical display device of the present invention, at least one of the electro-optical display devices may be the electro-optical display device of the present invention. In this case, it is preferred that the present invention is applied to at least the electro-optical display device used as the light valve for a blue color.

What is claimed is:

1. An electro-optical display device comprising:
    an active matrix unit including a substrate having one surface and the other surface and a plurality of switching elements provided on the one surface of the substrate;
    a shutter unit provided on the active matrix unit, the shutter unit comprised of:
        a base provided so as to oppose the one surface of the substrate, the base having a plurality of window portions provided in a corresponding relationship with the plurality of switching elements;
        movable plates provided above the plurality of window portions so as to be displaceable relative to the base, the movable plates opening and closing the plurality of window portions to obtain an opening state and a closing state of each of the plurality of window portions; and
        driving means for displacing the movable plates and switching the opening state and the closing state of each of the plurality of window portions; and
    a first microlens array provided on the other surface of the substrate of the active matrix unit, the first microlens array having a plurality of microlenses formed on the other surface of the substrate in a corresponding relationship with the plurality of window portions.

2. The electro-optical display device as claimed in claim 1, wherein the base has one surface and the other surface opposing to the one surface of the substrate, and the base includes a light shielding portion formed in the base other than the window portions, wherein the movable plates are provided so as to be displaceable along the one surface of the base so that the movable plates can be positioned over the window portions in the closing state and positioned over the light shielding portion in the opening state.

3. The electro-optical display device as claimed in claim 1, wherein the shutter unit is further comprised of biasing members for biasing the movable plates so as to maintain the opening state or the closing state of the window portions.

4. The electro-optical display device as claimed in claim 3, wherein each of the biasing members is constituted of an elastically deformable elastic member for supporting the movable plate.

5. The electro-optical display device as claimed in claim 1, wherein the driving means include a pair of electrodes, wherein one of the pair of electrodes is provided on the movable plates and the other of the pair of electrodes is provided on the side of the base, wherein the movable plates are displaced by applying a voltage to between the pair of electrodes, thereby generating an electrostatic attraction force between the pair of electrodes.

6. The electro-optical display device as claimed in claim 5, wherein each of the pair of the electrodes has a comb shape so as to mesh with each other.

7. The electro-optical display device as claimed in claim 1 further comprising a second microlens array provided on the shutter unit so as to oppose the first microlens array through the shutter unit and the active matrix unit.

8. The electro-optical display device as claimed in claim 1, wherein the window portions and the movable plates corresponding thereto are provided in plural numbers with respect to each of the switching elements.

9. The electro-optical display device as claimed in claim 1, wherein when the shutter unit is seen in a plan view, the movable plates have substantially the same shape as the window portions.

10. The electro-optical display device as claimed in claim 1, wherein the driving means is designed so as to be capable of adjusting the opening state and the closing state of each of the window portions.

11. The electro-optical display device as claimed in claim 1, wherein each of the plurality of switching elements is comprised of: a fixed electrode formed on the one surface of the substrate; a movable electrode provided so as to face a part of the fixed electrode so that the movable electrode is displaceable to come into contact with or move away from the fixed electrode, and a driving electrode provided to face the movable electrode with an electrostatic gap left between the movable electrode and the driving electrode, the driving electrode formed on the one surface of the substrate in a side by side relation with the fixed electrode, wherein the movable electrode is conducted with the fixed electrode by applying a voltage to between the movable electrode and the driving electrode, generating an electrostatic attraction force between the movable electrode and the driving electrode, thereby displacing the movable electrode and bringing the movable electrode into contact with the fixed electrode.

12. The electro-optical display device as claimed in claim 1, wherein the active matrix unit further includes a plurality of first wiring lines extending on the one surface of the substrate in a mutually parallel relationship and a plurality of second wiring lines intersecting the plurality of first wiring lines and extending on the one surface of the substrate in a mutually parallel relationship, each of the plurality of first wiring lines and each of the plurality of second wiring lines form an intersecting point, wherein each of the plurality of switching elements is provided near the intersecting point.

13. An electronic device provided with the electro-optical display device defined in claim 1.

* * * * *